United States Patent [19]

Lair et al.

[11] Patent Number: 5,110,616
[45] Date of Patent: May 5, 1992

[54] METHOD OF APPLYING LIQUID TO A PAN SURFACE IN A CONTROLLED SEQUENCE

[75] Inventors: James H. Lair; John E. Fagan, both of Norman, Okla.

[73] Assignee: Burford Corp., Maysville, Okla.

[21] Appl. No.: 407,531

[22] Filed: Sep. 15, 1989

Related U.S. Application Data

[63] Continuation-in-part of Ser. No. 231,588, Aug. 8, 1988, Pat. No. 4,925,699, which is a continuation of Ser. No. 937,961, Dec. 4, 1986, abandoned, which is a continuation-in-part of Ser. No. 796,083, Nov. 7, 1985, abandoned.

[51] Int. Cl.[5] .................. B05D 5/08; B05D 1/04
[52] U.S. Cl. .......................... 427/9; 427/28; 427/33; 427/424
[58] Field of Search ............ 427/33, 28, 424, 9; 118/DIG. 8, 622, 697, 698, 702–704, 314

[56] References Cited

U.S. PATENT DOCUMENTS

| | | | |
|---|---|---|---|
| 2,453,527 | 11/1948 | Mero | 118/682 |
| 2,526,763 | 10/1950 | Miller | 118/630 |
| 2,633,820 | 4/1953 | Koerber | 118/685 |
| 2,696,449 | 12/1954 | Ericks et al. | 427/424 |
| 2,754,227 | 7/1956 | Rausburg | 118/622 X |
| 2,764,508 | 9/1956 | Feick | 239/696 |
| 2,884,338 | 4/1959 | Jenison | 427/32 X |
| 2,888,362 | 5/1959 | Starkey | 427/29 |
| 2,955,565 | 10/1960 | Schotland | 118/696 |
| 3,065,106 | 11/1962 | Rhodes et al. | 427/28 |
| 3,641,971 | 2/1972 | Walberg | 118/671 |
| 4,186,886 | 2/1980 | Sickles | 239/691 |
| 4,313,968 | 2/1982 | Sickles et al. | 427/27 |

Primary Examiner—Evan Lawrence
Attorney, Agent, or Firm—Crutsinger & Booth

[57] ABSTRACT

A method of using a sequence control system in combination with a spray system for applying a liquid, such as cooking oil, to a surface of a pan carried by a conveyor. The controller, which is a microprocessor based unit, is connected to spray nozzles adapted for projecting atomized droplets of liquid between charged electrodes in a timed sequence to cause the charged droplets to be attracted to and impinge against partial areas of a grounded pan surface to form a continuous substantially uniform film of liquid on the surface.

8 Claims, 16 Drawing Sheets

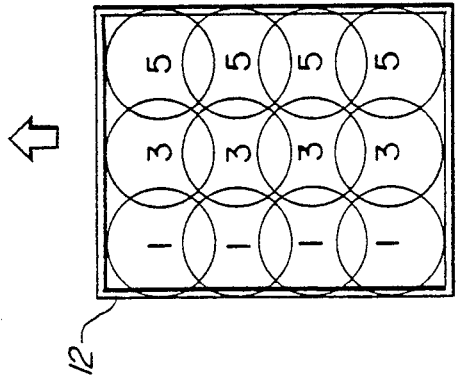
FIG.17
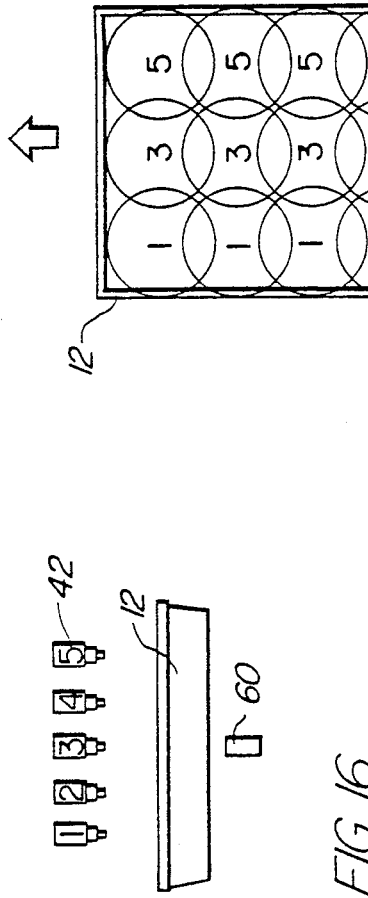
FIG.16
FIG.15
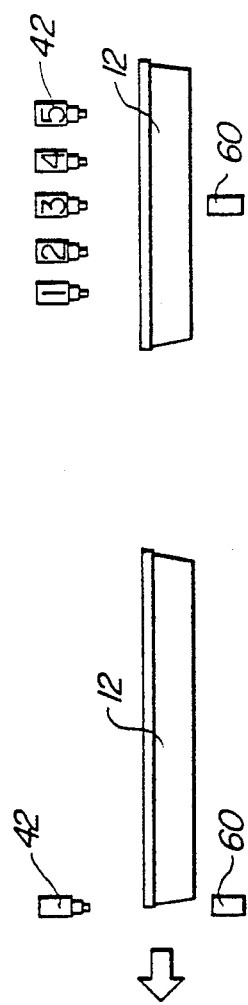
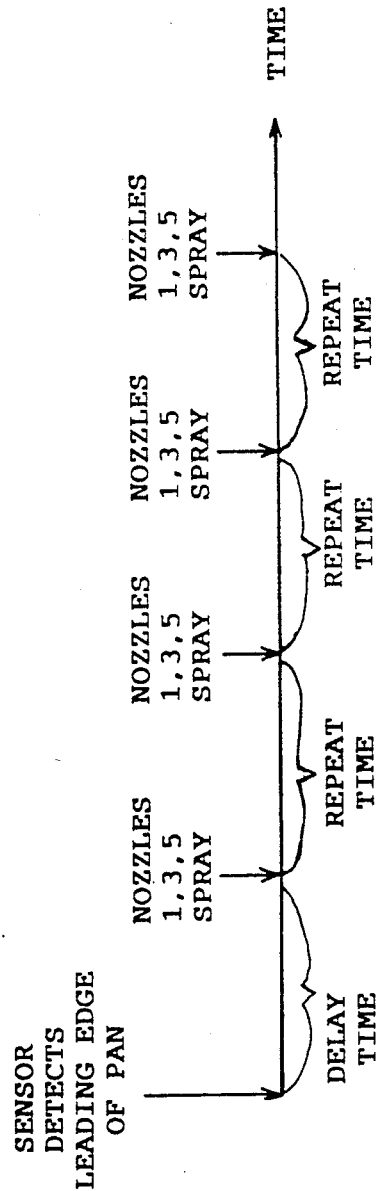
FIG.18

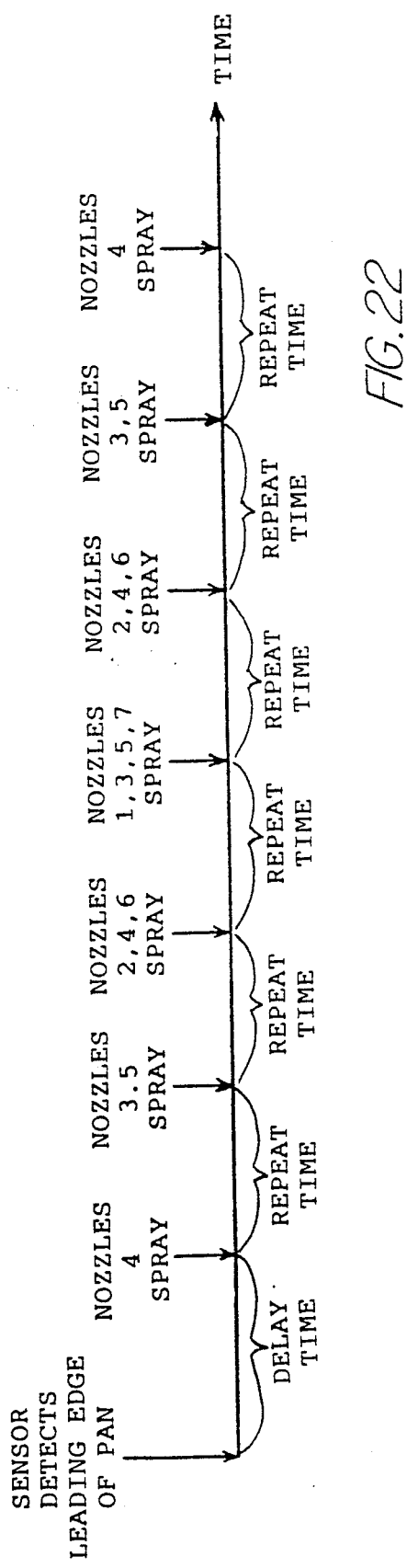
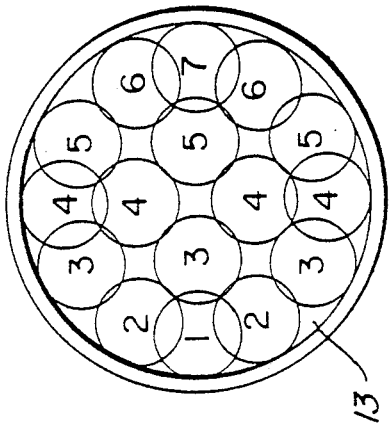
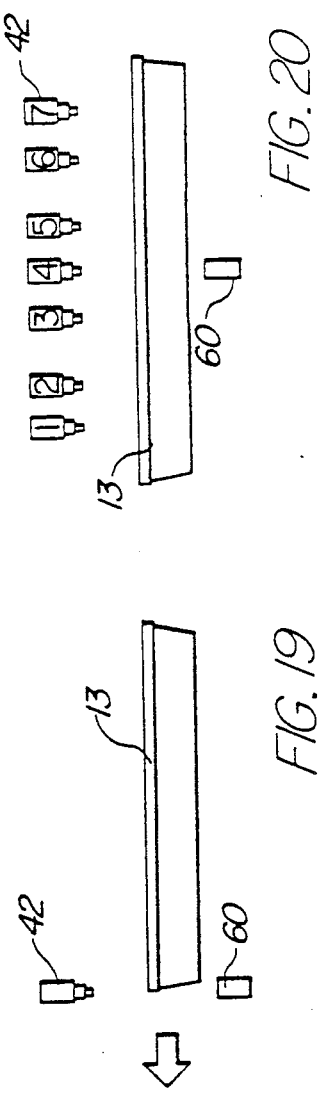

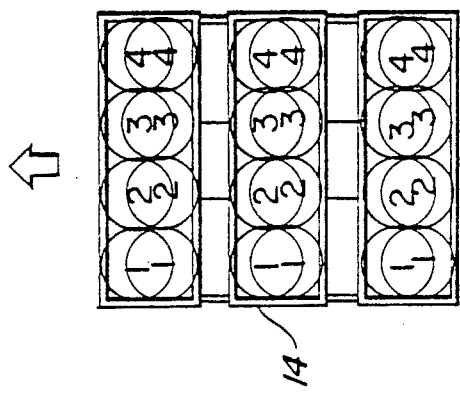
FIG. 24
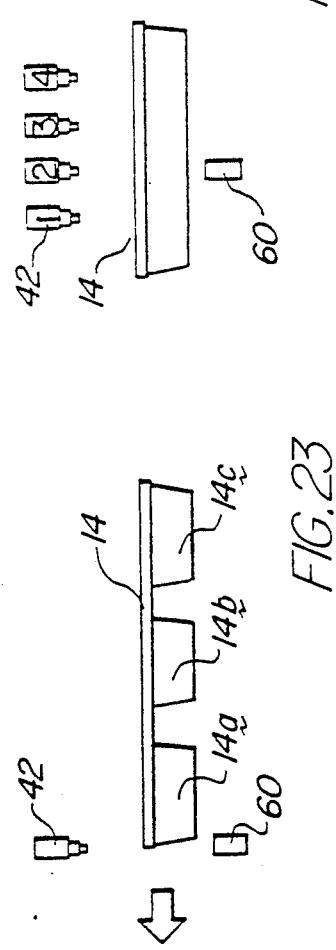
FIG. 23
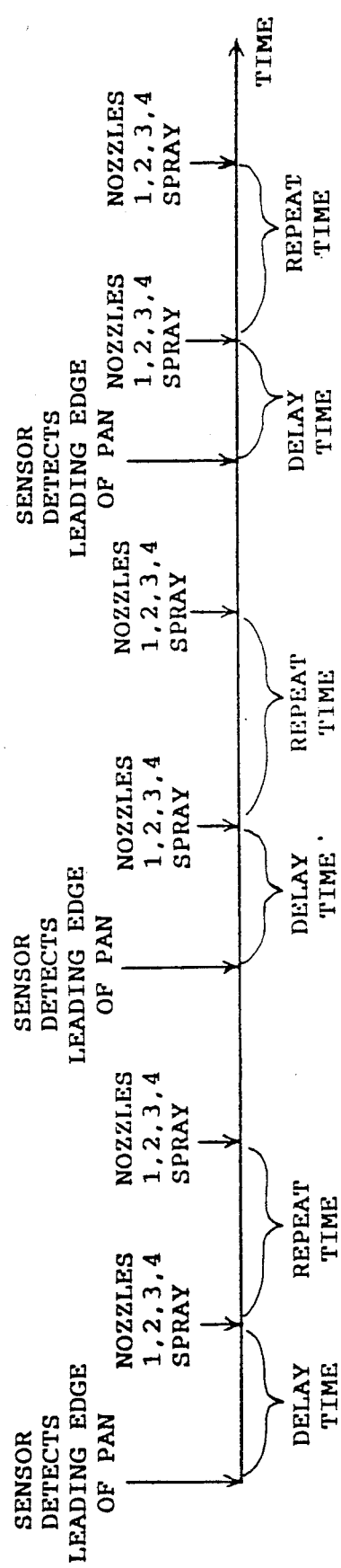
FIG. 25
FIG. 26

METHOD OF APPLYING LIQUID TO A PAN SURFACE IN A CONTROLLED SEQUENCE

CROSS REFERENCE TO RELATED APPLICATIONS

This application is a continuation-in-part of commonly owned application Ser. No. 07/231,588 filed Aug. 8, 1988, now U.S. Pat. No. 4,925,699, the disclosure of which is incorporated herein by reference in its entirety, which is a continuation of application Ser. No. 06/937,961, filed Dec. 4, 1986, now abandoned, which is a continuation-in-part of application Ser. No. 06/796,083, filed Nov. 7, 1985, now abandoned.

BACKGROUND OF THE INVENTION

The invention disclosed herein relates to a sequence control system in combination with a spray system and a method of using the same for applying cooking oil to surfaces of baking pans or applying oil, butter or other materials to surfaces of food products.

Sequence control apparatus heretofore employed for controlling bakery pan oilers have limited capability for applying precisely controlled quantities of liquid to precisely controlled areas on pan or conveyor band surfaces. Consequently, the systems tend to apply excessive quantities of oil or other materials which detracts from the quality of the resulting food product and requires excessive maintenance and cleaning to operate the systems.

Current systems for the application of oils and other release agents to pans used for commercial baking (commonly referred to as "oilers" or "greasers") provide very limited control of application patterns. Pan sensing is frequently a problem with these systems as well. Consequently, these systems are unable to oil some types of pans and they give poor results with many other pans. A sequence controller capable of extending the spray pattern capabilities of such systems and adapted to sense the location of a pan without using special sensors is needed.

Commercial pan oilers apply a release agent such as vegetable oil to the baking pan using one or more spray nozzles. The nozzles are usually mounted above a pan conveyor and spray into the pans as they pass below. Most oilers are designed for use with pans that have well defined cavities in a uniform rectangular arrangement. A typical nozzle configuration uses a selected number of nozzles positioned in a row across the pan conveyor. Each nozzle can be moved along a track to match nozzle spacing to the cavity spacing of various pans.

A pan sensor is normally mounted below the conveyor to sense the bottom profile of the pan. When the sensor detects the leading edge of each cavity, it triggers a short spray from all selected nozzles. The position of the spray within each cavity is determined by the position of the pan sensor relative to the nozzle line.

Pan sensor position is usually adjusted to trigger a spray in the center of each cavity. Spray duration is adjusted to control the amount of release agent applied per spray cycle. Since spray tips commonly used give relatively high flow rates, the maximum spray duration is typically less than a tenth of a second and, the pan travels only a few tenths of an inch along the conveyor during the spray cycle. This gives the effect of spraying a single shot or burst of oil into each cavity.

The current systems are limited because they only spray when a signal is received from the pan sensor. This means that a consistently detectable pattern of features must exist on some profile of the pan which exactly matches the desired pattern of sprays.

Most pan sensors in use are either the metal detecting proximity type or the optical proximity type. These sensors are on if they detect a sufficient amount of metal or a sufficient optical path. Because they are either on or off, and because they are only sensitive to a single characteristic of the pan, they are most effective where a high contrast profile exists. Bent pans, which are common in the industry, can cause the sensors to miss sprays. Also, many commercial baking pans have frames, braces, and unusual geometries which will cause misses or extra sprays.

The tremendous variety of baking pans used in commercial baking and the frequent requirement that a single oiler and pan sensor arrangement work with several different pans presents two major challenges. The first is to produce a pattern of sprays which gives a light, evenly distributed coating of release agent only on those portions of the pan which contact the baked product. The second is to consistently synchronize or align the spray pattern with moving pans.

Further, liquid sprayed through nozzles tends to form a very fine mist commonly referred to as "overspray" which does not adhere to the surface of the pan and results in contamination of the atmosphere in the vicinity of the pan or application of oil to surfaces around the pan.

SUMMARY OF THE INVENTION

The sequence controller disclosed herein is particularly adapted to provide spray pattern flexibility and minimize pan sensing problems. It allows spray pattern programming and only requires that the pan sensor detect a single synchronizing feature of the pan for each pattern of sprays produced.

The sequence controller is a self contained, microprocessor based unit which provides a user programmable sequence of electronic pulses for the control or synchronization of valves, relays, solenoids, and timers. Each pulse sequence is initiated either by an external sensor or by a front panel switch. The sequence controller allows a single sensor pulse or switch closure to trigger a series of evenly timed events. The standard sequence controller is housed in a 10"×8"×4" NEMA 13 enclosure which can be readily mounted to an oiler or a conveyor. It is connectable in-line between a pan sensor and an oiler and uses the low voltage DC power provided by the oiler for sensor operation and, therefore, does not require external power input.

The invention described herein incorporates an improved method of forming a thin film of liquid release agent on the surface of a pan which is particularly adapted for use in commercial bakeries. A mass of release agent is atomized by forcing the liquid through a nozzle to form small droplets which are propelled between a pair of positively charged electrodes to ionize the droplets by stripping electrons from the droplets, in the case of a release agent that is conducting, or readily ionizable. Prior to atomizing the liquid, it may be heated to adjust the viscosity and mixed with sodium chloride for increasing the conductivity of the liquid. The ionized droplets are sprayed onto the surface of a cooking pan for forming a film on the surface.

For spraying cooking oils that are nonconducting, or dielectric, the droplets are said to become electrically polarized, and the electrodes may be charged either positively or negatively. However, they must be shaped such that the electric field intensity in their vicinity is not too great, as would be the case with electrodes having a small radius of curvature.

The apparatus for carrying out the improved method comprises a pan sensor interfaced with the sequence controller for energizing a valve driver for directing a spray of droplets between charged electrodes in a timed sequence to cause the charged droplets to be attracted to and impinge against a grounded surface of a pan on a conveyor.

DESCRIPTION OF DRAWING

Drawings of a preferred embodiment of the invention are annexed hereto so that the invention may be better and more fully understood, in which:

FIG. 15 is a diagrammatic side elevational view of a rectangular pan in relation to a pan sensor and a row of spray nozzles;

FIG. 16 is an end view looking in the direction of the conveyor of the pan and nozzle arrangement illustrated in FIG. 15;

FIG. 17 is a top plan view of pan illustrating partial areas sequentially sprayed by a plurality of nozzles;

FIG. 18 is a timing diagram of spray timing for a rectangular sheet pan;

FIG. 19 is a diagrammatic side elevational view of a circular pan in relation to a pan sensor and a row of spray nozzles;

FIG. 20 is an end view looking in the direction of the conveyor of the pan and nozzle arrangement illustrated in FIG. 19;

FIG. 21 is a top plan view of circular pan illustrating partial areas sequentially sprayed by a plurality of nozzles;

FIG. 22 is a timing diagram of spray timing for a circular sheet pan;

FIG. 23 is a diagrammatic side elevational view of a multi-cavity sheet pan in relation to a pan sensor and a row of spray nozzles;

FIG. 24 is an end view looking in the direction of the conveyor of the pan and nozzle arrangement illustrated in FIG. 23;

FIG. 25 is a top plan view of the pan illustrating partial areas sequentially sprayed by a plurality of nozzles; and FIG. 26 is a timing diagram of spray timing for a multi-cavity sheet pan.

Like numeral references are employed to designate like parts throughout the various figures of the drawing.

DESCRIPTION OF A PREFERRED EMBODIMENT

Figure 1:
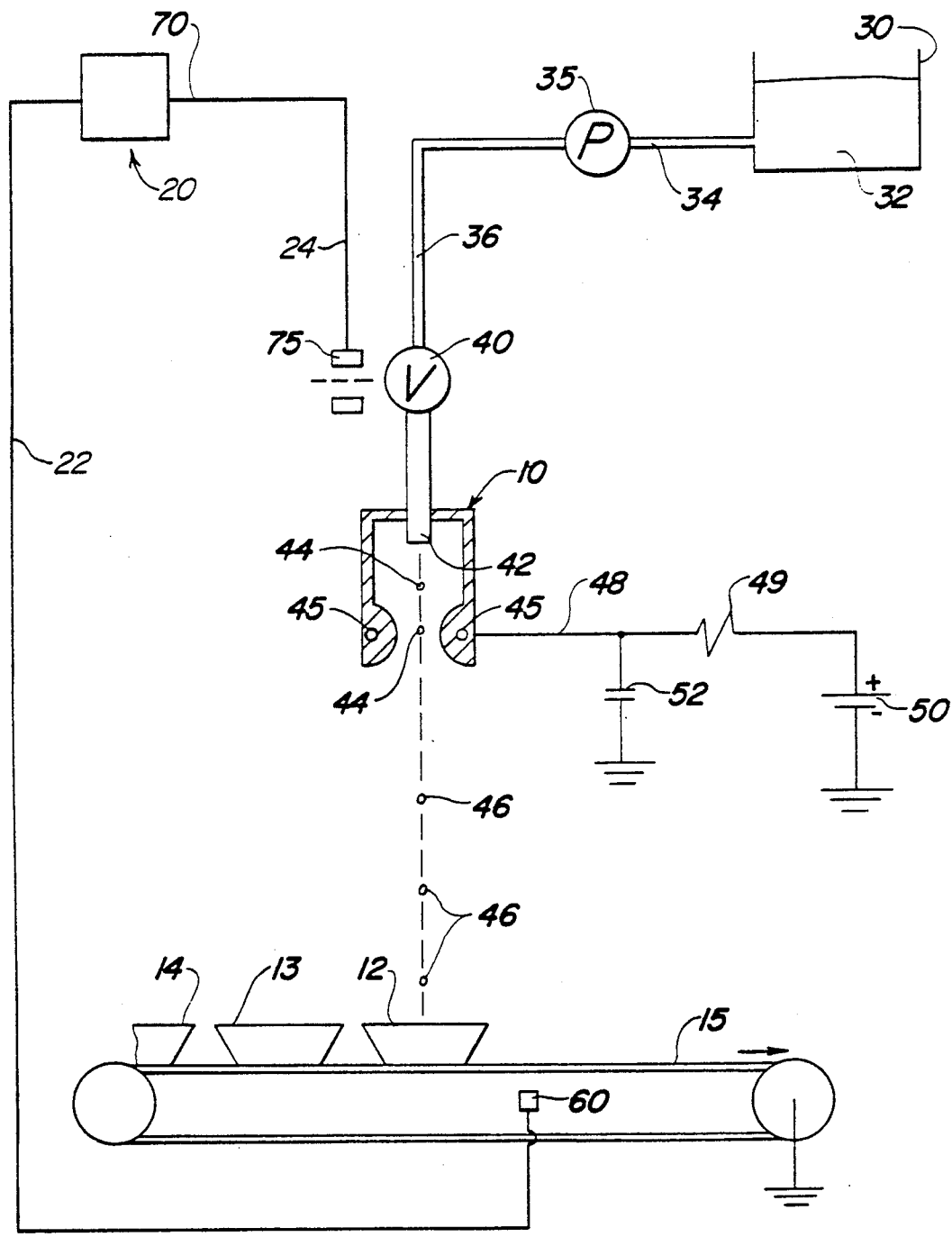
FIG. 1 is a schematic view of the spray system in relation to cooking pans carried on a conveyor.
Figure 8:
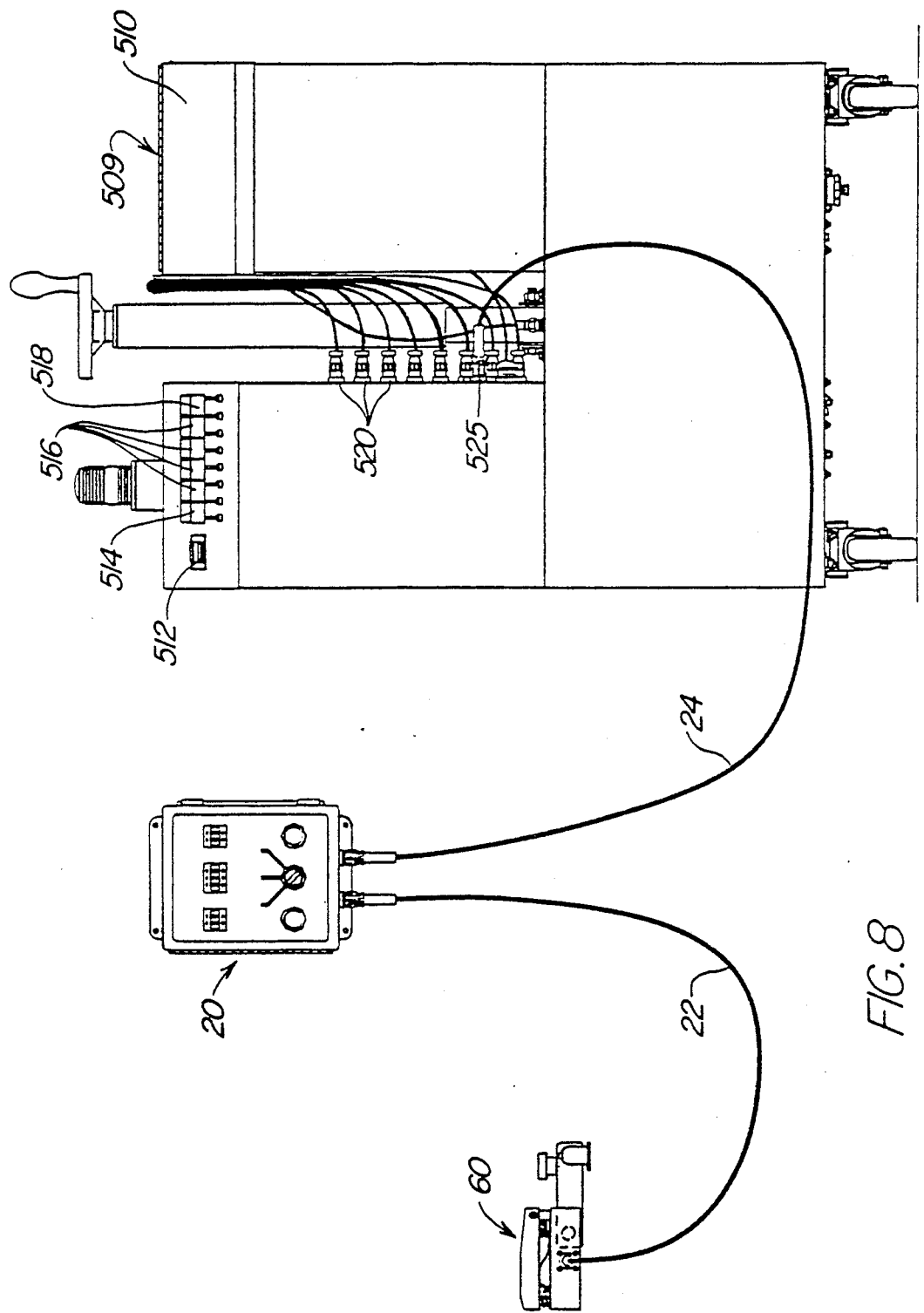
FIG. 8 is a diagrammatic view of a spray system, sequence controller and a pan sensor.
Figure 9:
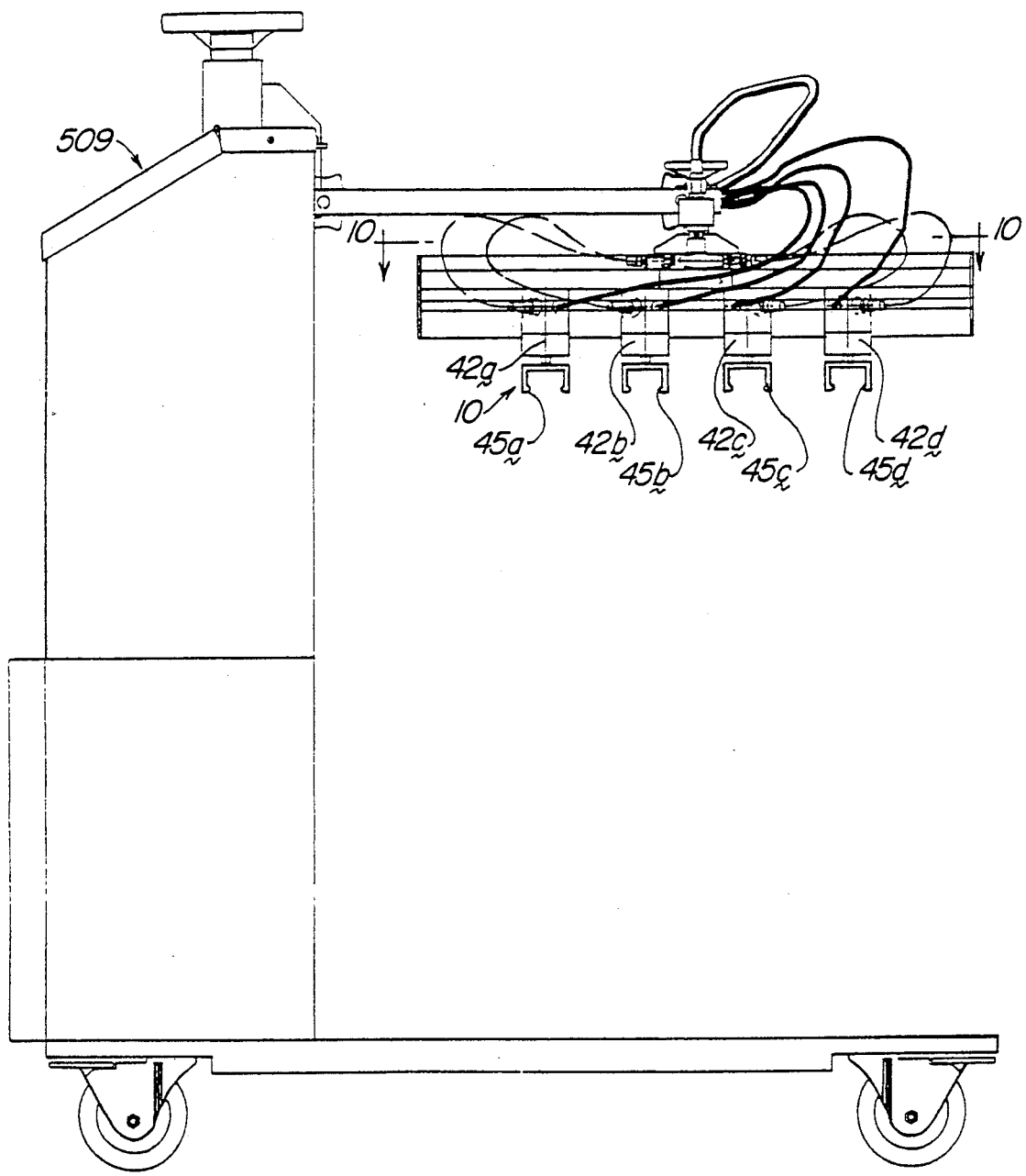
FIG. 9 is an elevational view of the spray system illustrated in FIG. 8 of the drawing, looking in a direction longitudinally of a conveyor.
Figure 10:
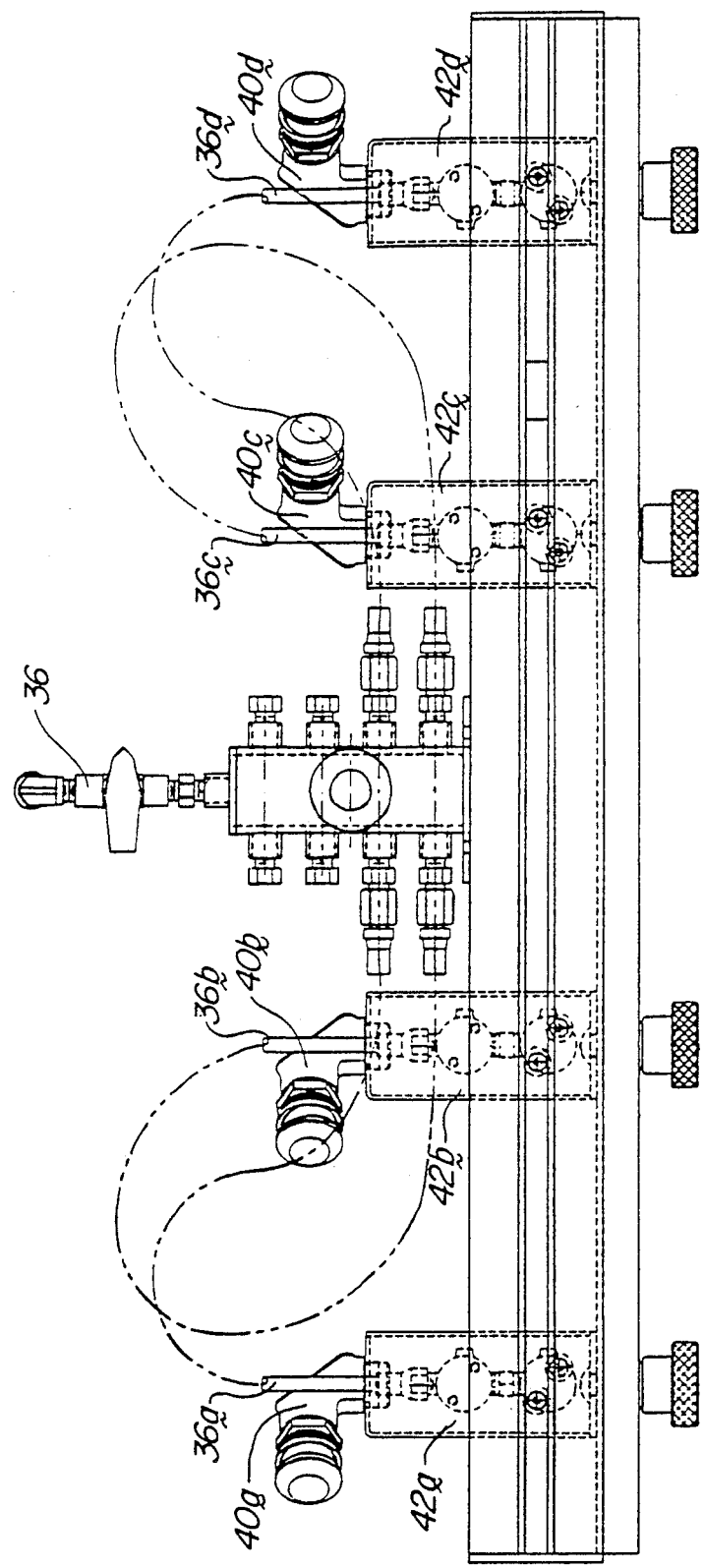
FIG. 10 is a cross-sectional view taken along line 10—10 of FIG. 9.

Referring to FIGS. 1, 8 and 9 of the drawings, the numeral 10 generally designates an electrostatic sprayer assembly in a pan oiler of the type disclosed in U.S. Pat. No. 4,925,699 for applying a film of oil to pans 12, 13 and 14 carried on a conventional conveyor 15, for example in a commercial bakery. Sprayer assembly 10 is controlled by a sequence controller generally designated by the numeral 20 to initiate and terminate spraying cycles in timed sequence with arrival and departure of pans 12, 13 and 14, as will be hereinafter more fully explained.

In FIGS. 8 and 9 the numeral 509 generally designates an oiler designed to spray a precision pattern of oil and pan release agents on bakery products and pans of the type which is commercially available from Burford Corp. of Maysville, Okla., distributed as "Burford Precision Oiler, Model 509." Oiler 509 forms no part of the present invention except in combination with the sprayer assembly 10 and sequence controller 20, as will be hereinafter more fully explained.

Oiler 509 incorporates a tank 510, a pump (not shown) a plurality of nozzles mounted on an adjustable nozzle mounting head and finger tip digital oil quantity adjustments, including a BCD switch 512, an on-off switch 514, status lights 516 and a manual spray push-button switch 518. Electrical connectors 520 are provided for connection with spray nozzles.

Spray assemblies 10 illustrated in FIG. 9 of the drawing and sequence controller 20 illustrated in FIG. 8 of the drawing incorporates significant improvements in structure of the type which may be used in conjunction with conventional components of existing systems.

Figure 5:
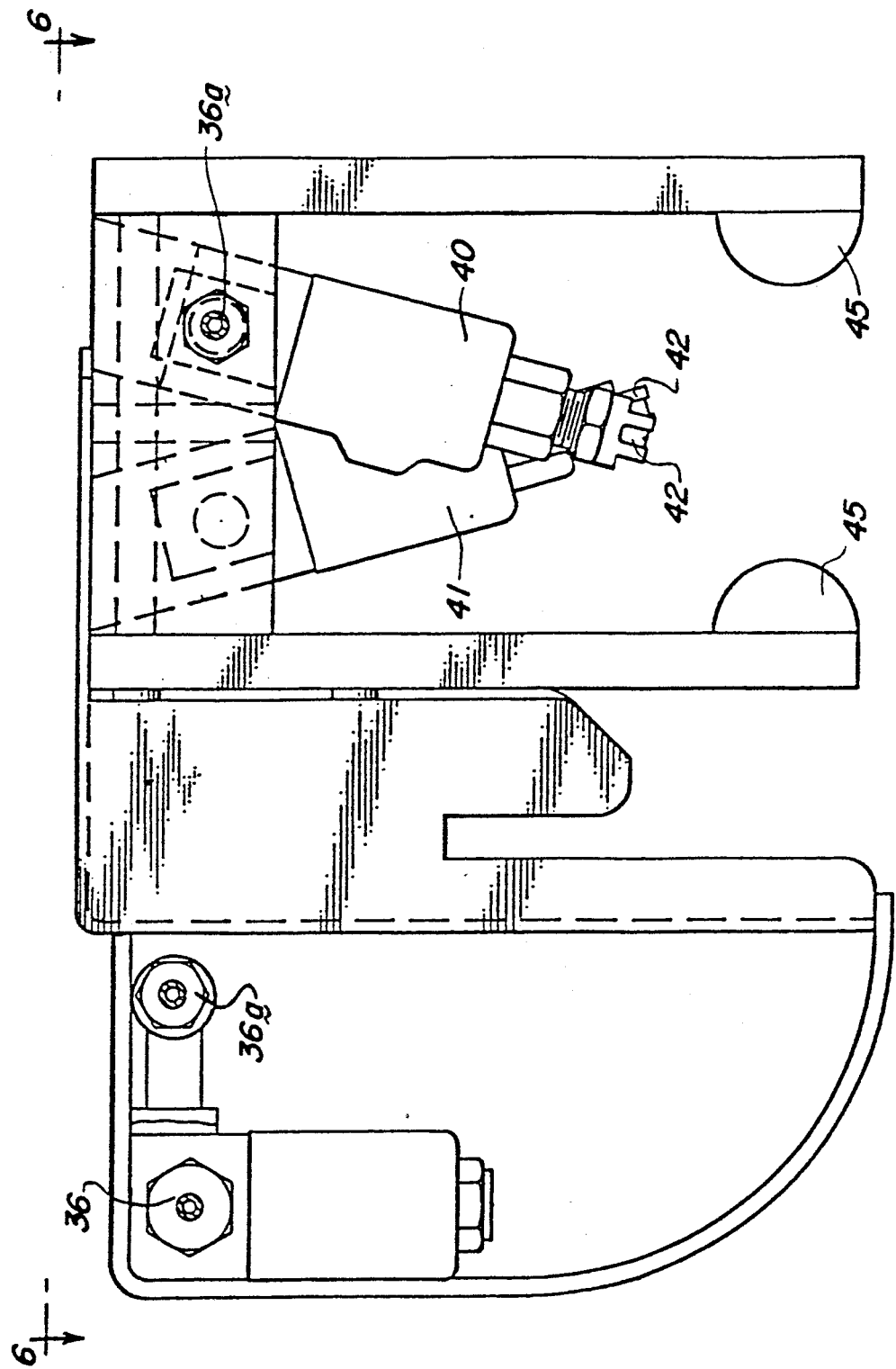
FIG. 5 is a front elevational view of spray valves associated with a pair of electrodes.
Figure 6:
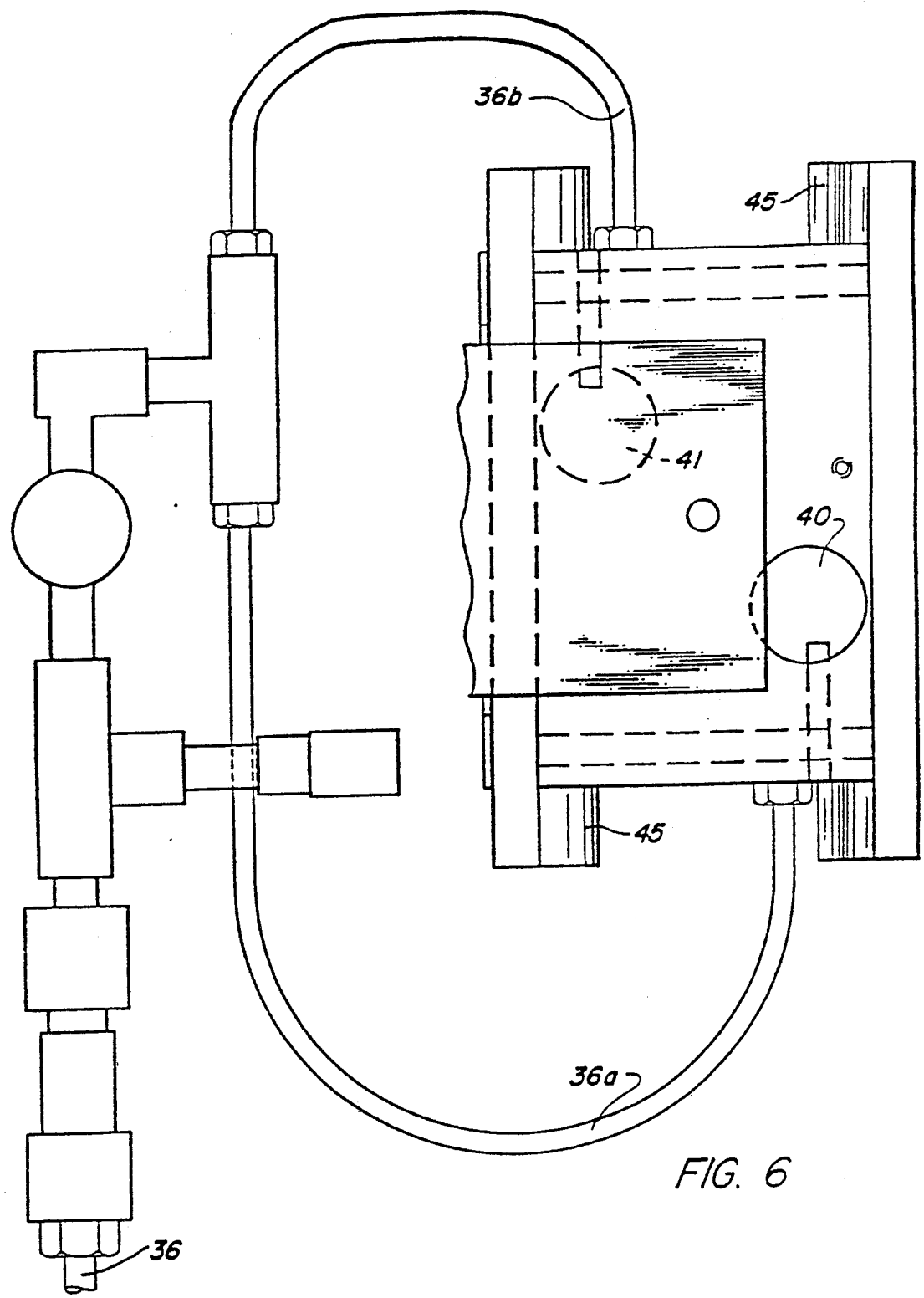
FIG. 6 is a top plan view looking in the direction of the arrows along lines 6—6 of FIG. 5.

The electrostatic oil sprayer 10 comprises a reservoir 30 containing a supply of liquid 32 connected through conduit 34 to the suction side of pump 35. The pressure side of pump 35 is connected through conduit 36 and branch conduits 36a and 36b, as illustrated in FIGS. 5 and 6 of the drawing to spray valves 40 and 41, each incorporating an atomizing chamber and spray tip or nozzle 42. The mass of pressurized liquid received from pump 35 is broken up into small droplets by spray valves 40 and 41 and a fan spray having an angle of approximately 110° is dispensed from valves 40 and 41 through nozzle 42.

A pair of electrodes 45 is positioned adjacent each nozzle 42 such that the stream of droplets flowing from each nozzle 42 will be directed between and in the vicinity of each of the electrodes 45.

Figure 4:
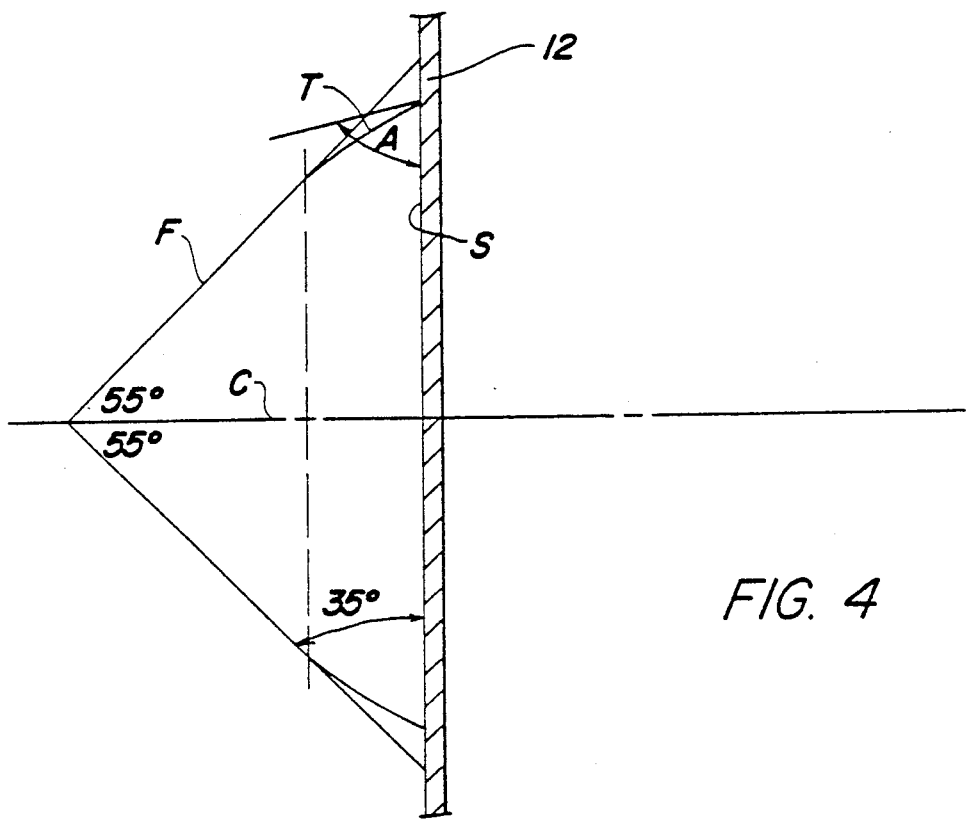
FIG. 4 is a diagrammatic view illustrating attraction of charged oil droplets to a pan.
Figure 3:
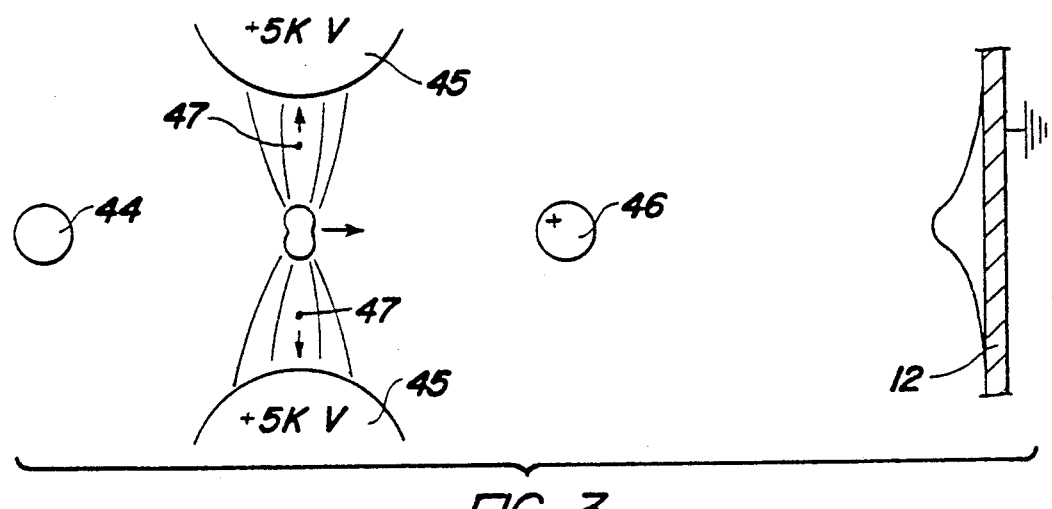
FIG. 3 is a diagrammatic view illustrating a spray pattern of charged oil particles.

As diagrammatically illustrated in FIGS. 3 and 4 of the drawing conducting, or readily ionizable, droplets 44, whether neutral or carrying a negative charge, moving between electrodes 45 will liberate electrons to electrodes 45. Electrodes 45 are preferably charged to an electrical potential in a range between four and ten kilovolts with respect to pans 12, 13 and 14 which are grounded. Ionized droplet 46, having given up one or more electrons, leaves the vicinity of electrodes 45 with a net positive charge.

The potential difference between ionized droplet 46 and pan 12 causes the droplet 46 to be electrically attracted by pan 12 and propelled along a trajectory directly to the surface of pan 12. This electrical attraction of pan 12 to the positively charged droplet 46 eliminates the possibility of "overspray" which has heretofore resulted from minute spray particles which tend to float in the air and settle on surfaces in the general vicinity of the pan.

Figure 7:
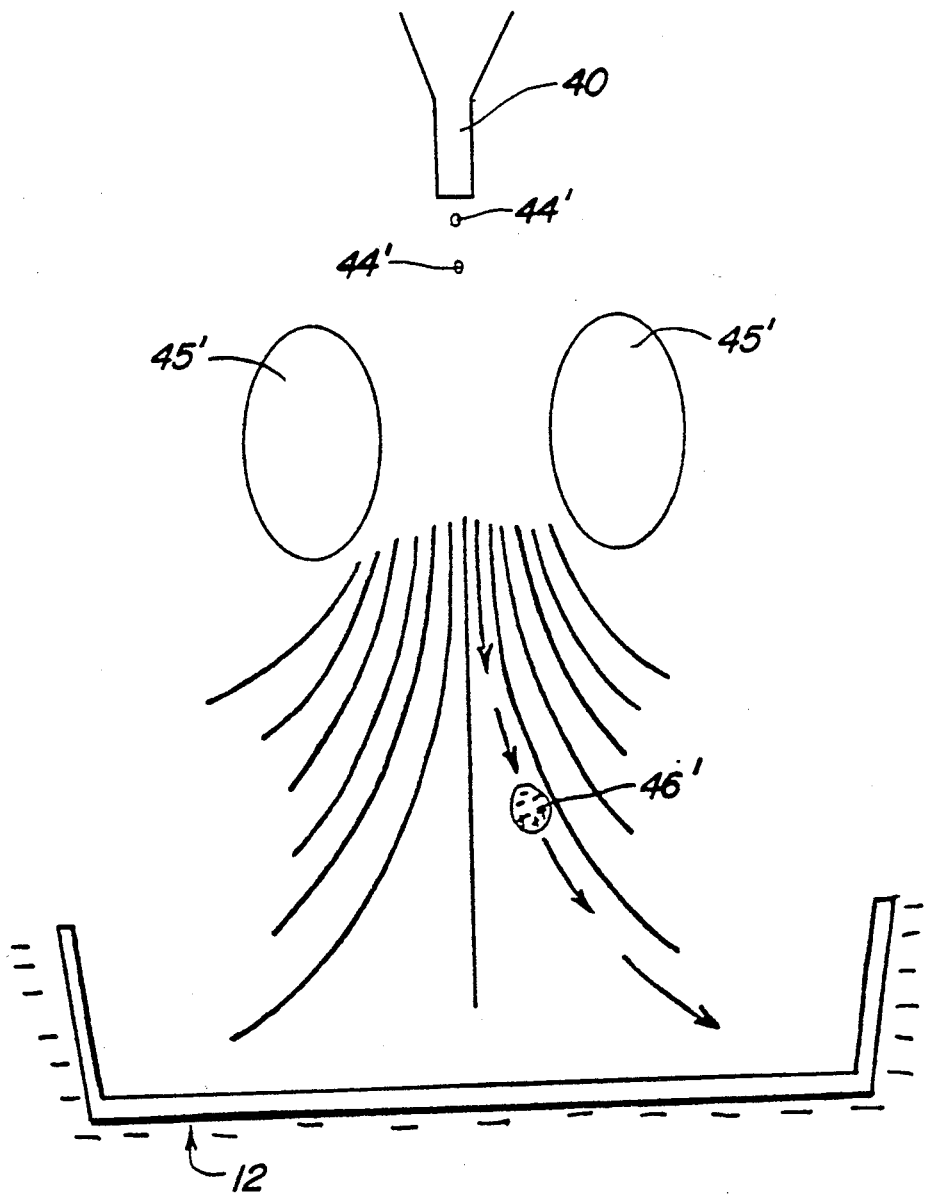
FIG. 7 is a diagrammatic view illustrating the electrical polarizing of non-conductive or dielectric oil droplets moving toward the surface of a pan.

As diagrammatically illustrated in FIG. 7 of the drawing, nonconducting, or dielectric, oil droplets 44', moving between positive electrodes 45' become electrically polarized, with their surfaces adjacent to electrodes 45' having induced negative charges and their surfaces adjacent to pan 12 having induced positive charges of equal magnitude. Alternatively, electrodes 45' may be negatively charged, in which case the induced surface charges would be positive, and negative, respectively.

Not nearly as high field potentials have to be used, and electrodes 45' are charged to an electrical potential in a range between four and six kilovolts with respect to pan 12 which are grounded.

Since a dielectric body in a nonuniform field always experiences a force urging it from a region where the field is weak toward a region where it is stronger, provided the dielectric coefficient of the body is greater than that of the medium in which it is immersed as is the case here, electrically polarized oil droplets 46' are steered to the surface of bread pan 12 along the electric stream lines, as is shown in FIG. 7. Also contributing to this, of course, is the force of gravity. This occurs without the individual molecules being torn down, thus leaving the structure of the cooking oil molecules intact.

Droplets 46' are steered through the electric field toward bread pan 12. Electrodes 45' must be shaped such that the electric field intensity in their vicinity is not too large, as would be the case with electrodes having a small radius of curvature. For example, small spherical electrodes or those containing sharp points or knife edges will cause the droplets to curl around the electrodes. For this reason, electrodes 46' are, for illustrative purposes, depicted as elliptical in shape. They are preferably made of a polycarbonate conductive plastic.

The principle of conservation of energy is applicable to the motion of the charged droplets 46 and 46' as they impinge against the surface of pan 12. The change in electrical potential energy and the change in kinetic energy of charged droplets 46 and 46' is employed to overcome the surface tension of the droplets and spread the droplets on the surface of the pan. By adjusting the speed, direction and potential gradient between droplets 46 and pan 12, and between droplets 46' and pan 12, the ability of droplets 46 and 46' to wet the surface of the pan to form an unbroken film while eliminating "overspray" is enhanced. Extremely fine particles of the liquid, having a very low mass, are accelerated and, "steered" to pan 12.

Reservoir 30 is preferably maintained in a temperature range between 50° C. (122° F.) and 95° C. (203° F.) to control the viscosity of the oil solution and to enhance atomizing the oil flowing from nozzles 42. For proper atomization the viscosity of the oil is preferably maintained in a range of about 130 to 150 Saybolt universal seconds.

As diagrammatically illustrated in FIG. 3 of the drawing droplet 44 moving between spaced electrodes 45 will be approximately equally attracted to each of the electrodes such that the momentum of the droplet will carry it through the field between the electrodes without causing significant deviation in the path of the droplet. Electrons 47 loosely held by the sodium and chloride atoms are subjected to a strong electrical attraction and are stripped from the droplet 44 to form the ionized droplet 46.

The center of the spray fan is directed substantially perpendicularly to the surface of pan 12 such that droplets moving in the outer extremities of the 110° spray will be directed along a path to impinge the plane of the surface of the bottom of pan 12 at an angle of approximately 35°. However, due to the "steering" of charged droplets 46 and 46' to the surface S of pan 12 the trajectory T of droplets 46 and 46' will deviate from the straight line path of an uncharged particle such that droplets 46 and 46' will impinge against surface S at an angle of incidence A of more than 45°.

The stream of liquid exiting nozzles 42 must have sufficient velocity to atomize the liquid to form droplets 44 but should move as slowly as possible to remain between electrodes 45 and 45', respectively for a sufficient time to permit charging of the droplets. If oil droplets 44 and 44' move between electrodes 45 and 45', respectively, at a velocity in a range between 10 and 20 meters per second, the droplets will be sufficiently charged.

Referring to FIG. 1 of the drawings, electrodes 45 for charging conducting cooking oil are charged to an electrical potential in a range between four and ten kilovolts through a conductor 48, and a 100 meg-ohms resistor 49 by an electrical source 50. Electrodes 45' for charging nonconducting, or dielectric, cooling oil, are charged to a potential in a range between four and six kilovolts, and may be positive or negative.

Electrical source 50 is of conventional design and comprises a transformer and rectifier circuit for converting, for example, 110 volts of alternative current electricity to 5,000 volts direct current. A capacitor 52 is connected from conductor 48 to ground to function as a spark arrester and to prevent injury to operators who might come in contact with electrodes 45 or 45'. A human body has a representative resistivity of about 100 kilo-ohms. Thus, if an operator contacts electrodes 45 or 45', the electrical charge on the capacitor is dumped and the operator receives about five volts. When the operator moves out of contact with electrode 45 or 45' capacitor 52 will be recharged over a time period of from one to two seconds and the potential of electrodes 45 or 45' will increase to five kilovolts.

It should be readily apparent that the provision of resistor 49 and capacitor 52 in the charging circuit provides a safety device and also prevents electrode arcs to pan 12.

A pan sensor 60 is mounted either below or adjacent a side of conveyor 15 and is adapted to generate a signal through sensor interface cable 22 to indicate the arrival and departure of pans 12, 13 and 14. As will be hereinafter more fully explained, sequence controller 20 and pan sensor 60 control spraying cycles.

Figure 2:
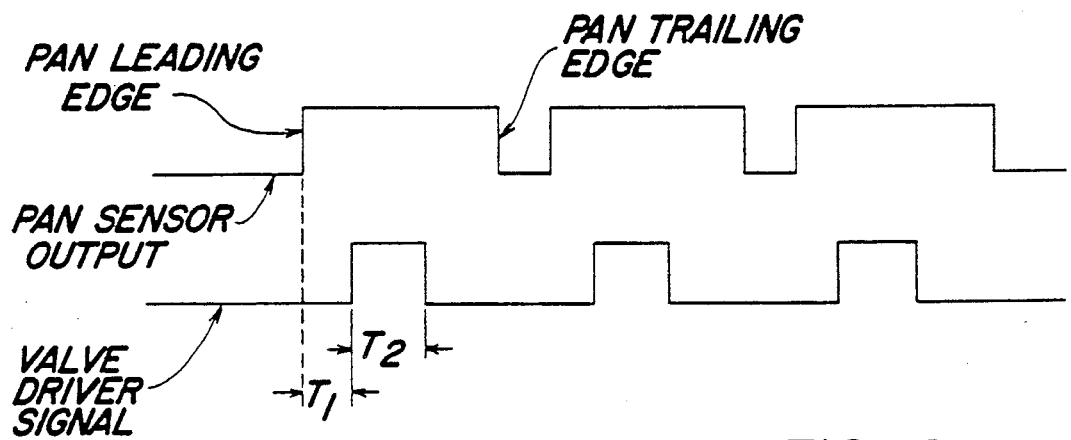
FIG. 2 is a timing diagram of the control system.

A typical timing diagram is illustrated in FIG. 2 of the drawing. Time T1 is the time delay determined by time delay device between the arrival of the leading edge of the pan 12 and the time when the spraying cycle will be initiated. A time duration device controls the duration T2 during which valve 40 is maintained in an open condition between the time the spray cycle is initiated and terminated. The cycle is repeated as each pan moves into a position to be sprayed. It should be readily apparent that control circuit 20 initiates and terminates spraying cycles based on the presence of pans 12, 13, and 14, even though the pans may be irregularly spaced on conveyor 15.

For application of oil to pockets in bun pans wherein several rows and columns of recesses are formed in a single pan, a plurality of spray nozzles 42 are preferably positioned across the width of conveyor 15 and positioned to spray oil into each recess in the pan. The width of the area sprayed by each nozzle 42 can be adjusted by moving nozzle 42 either toward or away from conveyor 15 such that the width of the area sprayed by the 110° spray pattern will be increased as nozzle 42 is moved away from conveyor 15 and decreased as nozzle 42 is moved toward conveyor 15.

Pan sensor 60 may assume any suitable configuration. In the embodiment illustrated in FIG. 8 of the drawing pan sensor 60 comprises a microswitch which is opened and closed by the bottom of pans 12, 13, and 14 to find the leading edge of each cavity which is to be sprayed.

Pan sensor 60 may assume other and further configurations, including an optical pan sensor (not shown) which may be used where bottom sensing is not possible or practical or where magnetically actuated microswitches cannot be used if pans are not metallic. In an optical pan sensor, an optical beam is directed between an infrared transmitter and an infrared receiver mounted adjacent opposite sides of Conveyor 15. The optical beam is broken by cups formed in pans 12, 13, and 14.

Sequence Controller

Figure 11:
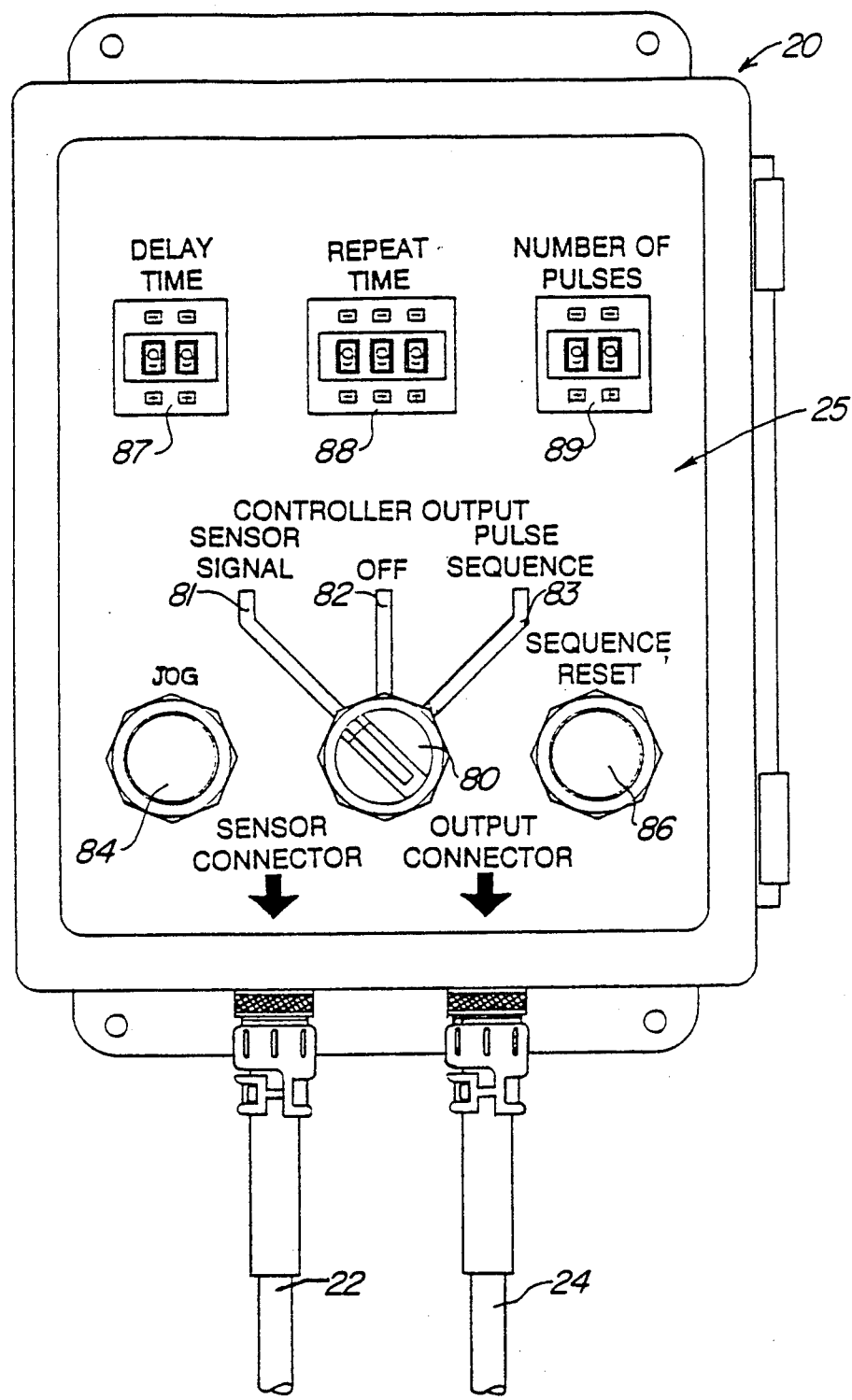
FIG. 11 is an elevational view of the sequence controller.

The sequence controller generally designated by the numeral 20 in FIGS. 8 and 11 of the drawing is a self contained, microprocessor based unit which provides a user programmable sequence of electronic pulses for the control or synchronization of valves, relays, solenoids, and timers. Each pulse sequence is initiated either by an external sensor 60 or by a front panel switch. The sequence controller 20 allows a single sensor pulse or switch closure to trigger a series of evenly timed events. The sequence controller is housed in an enclosure which can be readily mounted to oiler 10 or conveyor 15. It is connected in-line between the pan sensor 60 and the oiler 10 by sensor interface connector cable 22 and output interface cable 24, respectively. The controller 20 uses the low voltage DC power provided by the oiler 10 for sensor operation and, therefore, does not require external power input.

Figure 14:
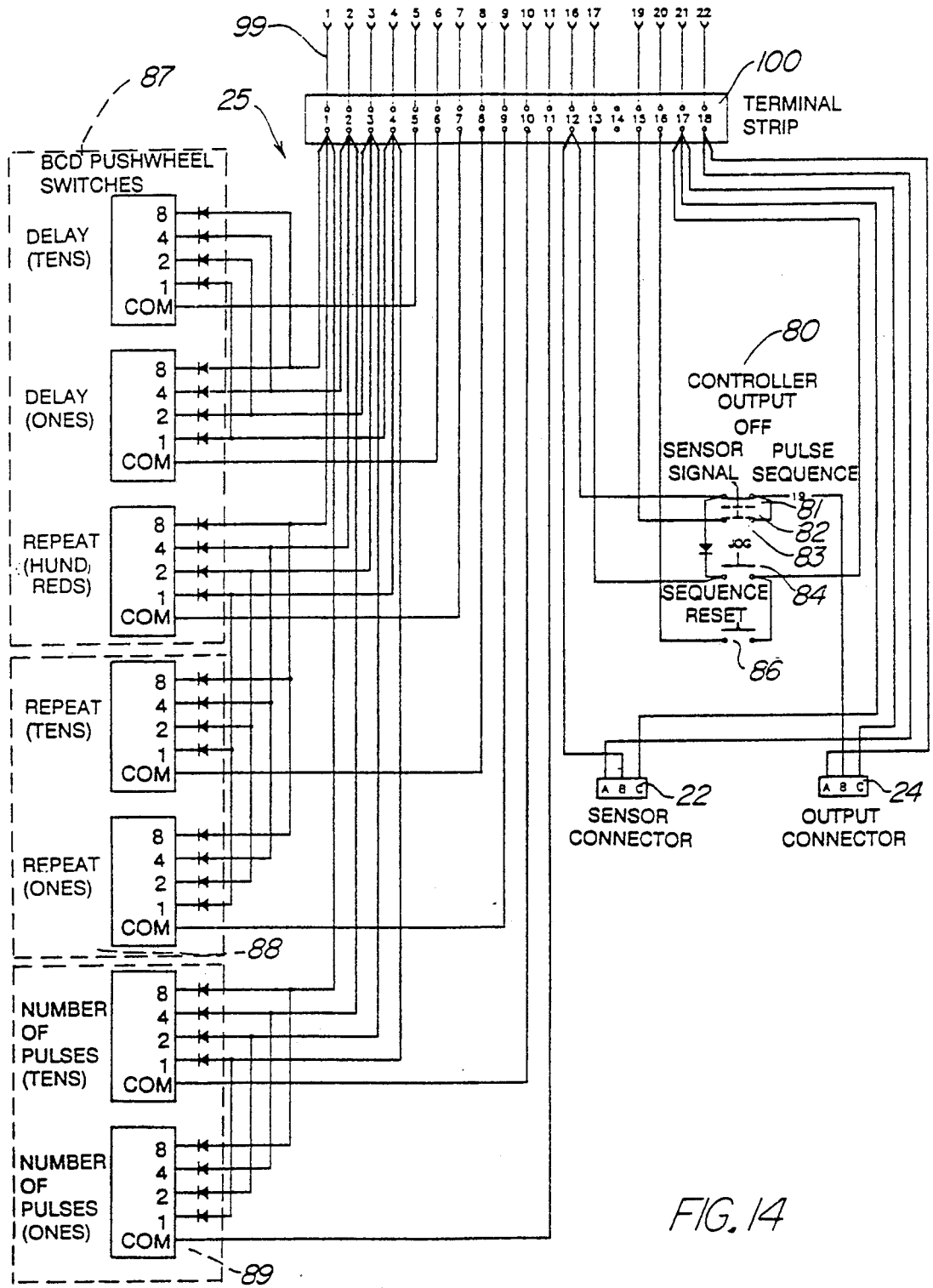
FIG. 14 is a wiring diagram of the sequence controller.

The physical layout of the front panel switches is illustrated in FIG. 11 of the drawing. A wiring diagram and the relationship of the front panel switches is illustrated in FIG. 14.

As will be hereinafter more fully explained, controller output switch 80, jog switch 84 and sequence reset switch 86 are mounted on front panel 25 for turning on controller 20, manually triggering a pulse sequence, and terminating a pulse sequence in progress.

Front panel switches illustrated in FIG. 11, allow the operator to control three main parameters of the sequence: DELAY TIME, REPEAT TIME, and NUMBER OF PULSES.

The DELAY TIME control 87 is a two digit pushwheel switch that allows the operator to program the delay time between the sensor input which initiates the sequence and the first output pulse of the sequence. This control can be set to any number from "00" to "99" and this corresponds to a delay of 0.00 to 0.99 seconds (delay time=setting/100).

The REPEAT TIME control 88 is a three digit pushwheel switch that allows the operator to program the time between all subsequent pulses of the pulse sequence. This control can be set to any number from "000" to "999" and this corresponds to 0.000 to 4.995 seconds between pulses (repeat time=setting/200). Because zero time between pulses is not possible, the controller will generate only one pulse when the REPEAT time control is set to "000."

The NUMBER OF PULSES control 89 is a two digit pushwheel switch that allows the operator to program the desired number of pauses in each sequence. This control can be set to any number of pulses from "00" to "99."

The three remaining front panel controls of the Sequence Controller allow the operator to manually trigger a pulse sequence, stop a pulse sequence which is in progress, bypass the controller with the sensor signal, or turn off the controller output.

The CONTROLLER OUTPUT switch 80 is a three position rotary switch. In the left position 81 (SENSOR SIGNAL) the sequence function is bypassed and the sensor signal is transferred directly to the output connector. When the selector switch is in the center position 82 (OFF), no output is generated. In the right position 83 (PULSE SEQUENCE) the controller is active and sensor input will trigger an output pulse sequence based on the front panel settings.

The JOG switch 84 is a momentary pushbutton which allows the operator to trigger a pulse sequence for test purposes.

The SEQUENCE RESET switch 86 is a momentary pushbutton which allows the operator to terminate a pulse sequence which is in progress. This has been provided since a sequence can be very long. For example, if the NUMBER OF PULSES is set to 99 and the REPEAT TIME is set to 999 then the entire pulse sequence will take about eight minutes (99×4.995 seconds). In order to change any settings the operator must wait until the current sequence ends or is reset.

Switches 80, 84 and 86 and control switches 87, 88 and 89 are connected as illustrated in FIG. 14 of the drawing to a terminal strip 100 and interface cables 22 and 24.

Figure 12:
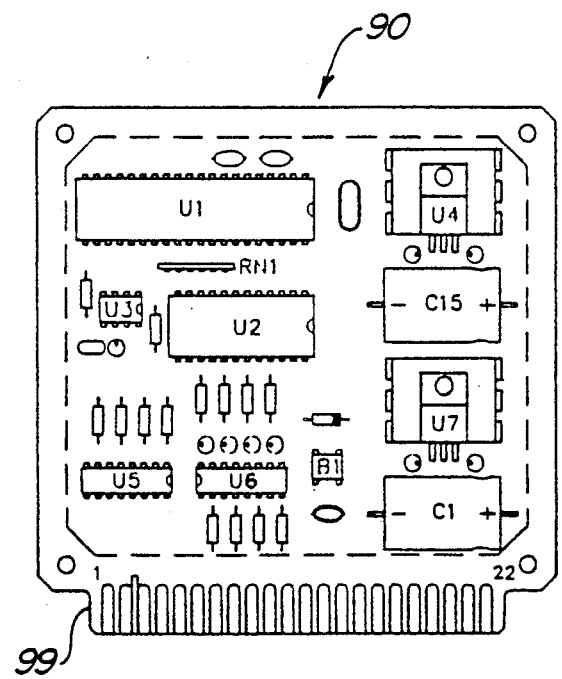
FIG. 12 is a front elevational view of a circuit board which is a component of the sequence controller.

Referring to FIG. 12 of the drawing, the numeral 90 generally designates a circuit board having integrated circuits including a microcomputer U1, decode U2, timer U3, voltage regulators U4 and U7, and optoisolators U5 and U6 mounted thereon. The integrated circuits on board 90 are connected to printed circuits as diagrammatically illustrated in FIG. 13 which has been illustrated as FIGS. 13A and 13B. The circuit is connected to a row 99 of connectors on board 90 which plug into terminal strip 100 as illustrated in FIG. 12 of the drawing.

Each pulse produced by the sequence controller 20 is about eight milliseconds long. The output is provided by an optically coupled, open collector NPN, transistor which sinks current to DC ground. It is normally "off" and switches "on" during each pulse interval.

Figure 13A:
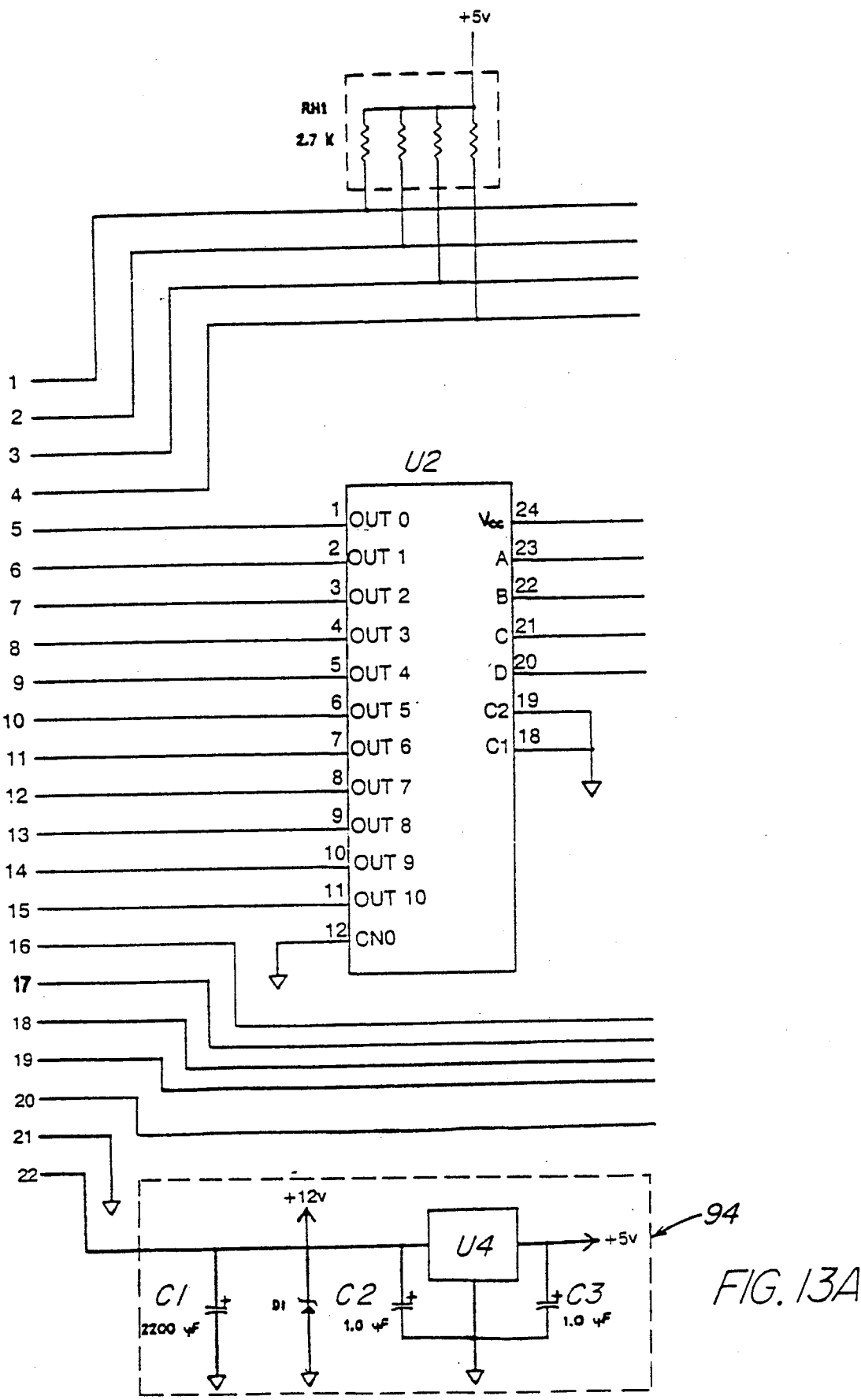
FIGS. 13A and 13B are a wiring diagram of the circuit board.
Figure 13B:
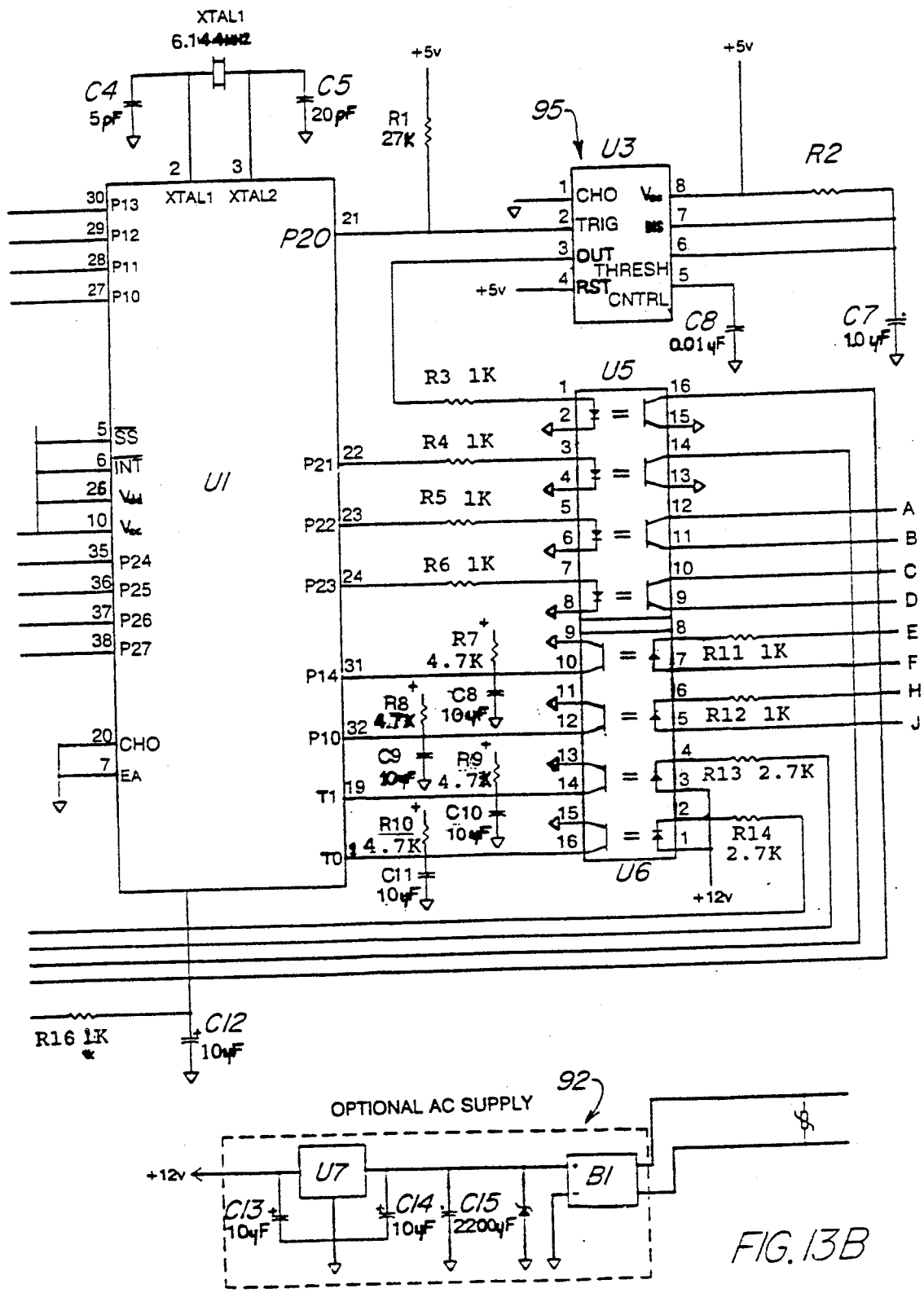

The microcontroller designated U1 in FIGS. 13B and 14 is for example an Intel 8748H HMOS-E single component 8-bit microcomputer which is commercially available from INTEL CORPORATION of Santa Clara, Ca. The microcontroller U1 is a totally self-sufficient, 8-bit parallel computer fabricated on single silicon chips using an N-channel silicon gate HMOS-E process.

Microcontroller U1 contains twenty-seven I/O lines, an 8-bit timer/counter, on-chip RAM and on-board oscillator/clock circuits. For systems that require extra capability, it can be expanded using MCS 80/MCS 85 peripherals.

The microcomputer U1 is an efficient controller as well as an arithmetic processor. It has extensive bit handling capability as well as facilities for both binary and BCD arithmetic. Efficient use of program memory results from an instruction set consisting mostly of single byte instructions and no instructions over 2 bytes in length.

The decoder designated U2 in FIGS. 12, and 13A is commercially available from National Semiconductor Corporation of Santa Clara, Ca. as DM74LS154 Decoders/Demultiplexers. The four-line-to-16-line decoder U2 utilizes TTL circuitry to decode four binary coded inputs into one of sixteen mutually exclusive outputs when both the strobe inputs, G1 and G2, are low. The demultiplexing function is performed by using the four input lines to address the output line, passing data from one of the strobe inputs with the other strobe input low. When either strobe input is high, all outputs are high. The demultiplexer is ideally suited for implementing high-performance memory decoders. All inputs are buffered and input clamping diodes are provided to minimize transmission-line effects and thereby simplify system design.

Monostable timer U3 illustrated in FIG. 13B and FIG. 14 is a National Semiconductor LM555 Timer. The LM555 is a highly stable device for generating accurate time delays or oscillation. Additional terminals are provided for triggering or resetting. In the time delay mode of operation, the time is precisely controlled by one external resistor and capacitor. For a stable operation as an oscillator, the free running frequency and duty cycle are accurately controlled with two external resistors and one capacitor. The circuit may be triggered and reset on falling wave forms, and the output circuit can source or sink 200 mA or drive TTL circuits.

Voltage regulators U4 and U7, illustrated in FIGS. 13A, 14 and 15, are of the type which are available from National Semiconductor Corporation. Voltage regulator U4 is a 55 V, 1.5 amp voltage regulator such as National Semiconductor Corporation Voltage Regulator Catalog No. LM340KC while voltage regulator U7 is a 12V, 1.5 amp voltage regulator such as National Semiconductor Corporation Voltage Regulator, Catalog No. LM340KC-12. The positive 3-terminal voltage regulators U4 and U7 provide good electrical and thermal performance in a packaged IC which results in outstanding ripple rejection, superior line and load regulation in high power applications (over 15 W).

Current limiting is included in regulators U4 and U7 to limit peak output current to a safe value. Safe area protection for the output transistor is provided to limit internal power dissipation. If internal power dissipation becomes too high for the heat sinking provided, the thermal shutdown circuit takes over limiting die temperature. Although designed primarily as fixed voltage regulators, these devices can be used with external components to obtain adjustable voltages and current. For output voltages other than 5 V, 12 V, and 15 V, the LM117 series of regulators provides an output voltage range from +1.2 V to +57 V.

Ouad optoisolators U5 and U6 are of the type which are available as Digi-Key Part Number PS2501 4NEC Phototransistor Output with a peak voltage of 5000 V(rms), an isolation voltage ratio of 300%, BV(ceo) of 80, and a typical rise/fall of 3/5 millisecond.

Typically the sequence controller 20 is powered by the +12 VDC provided by the oil applicator 10 for the operation of the pan sensor 60. The sequence controller 20 circuit board 90, illustrated in FIG. 14 also has an optional power supply which can be operated from a 14 VAC source. This supply will then provide the +12 VDC required for most pan sensors as well as all power needed for the sequence controller 20.

An optional +12 VDC supply 92, diagrammatically illustrated in FIG. 13B, is composed of components including voltage regulator diode or varistor VR1, rectifier B1, diode D2, capacitor C14, capacitor C15, capacitor C13, and voltage regulator U7. Varistor VR1 provides protection against large voltage transients which might appear across the AC input lines. Rectifier B1 is a full wave bridge rectifier which converts the 14 VAC input power to DC power. The DC voltage is then limited to a safe value by the zener diode D2 and filtered by capacitor C15. The DC power is then regulated by an LM340KC-12 integrated voltage regulator U7 to a value of +12 VDC for use by the +5 VDC regulator circuit 94 and the pan sensor 60. Capacitors C13 and capacitor C14 serve to filter high frequency noise from the supply and stabilize the regulator.

Most of the circuits on the circuit board 90 of sequence controller 20 require +5 VDC power. This voltage is provided by regulator circuit 94 which includes a voltage regulator U4, capacitors C1, capacitor C2, capacitor C3, and diode D1. Diode D1 limits the +12 VDC input to a safe level. Since this input is normally provided by an external source wiring errors or malfunctions or electrical noise could result in excessive input voltage. Capacitor C1 filters the incoming power and capacitors C2 and capacitor C3 provide additional filtering and regulator stabilization. Voltage regulator U4 is an LM340KC-5 integrated voltage regulator which provides up to 1.5 amps of current at a constant +5 VDC level. Referring to FIG. 12B, when power is applied to the sequence controller 20, capacitor C12 is charged by a pull-up resistor in the 8748 microcontroller U1. The microcontroller U1 is held in a reset state until the voltage on capacitor C12 (pin 4 of microcomputer U1) reaches a threshold level. This insures that the program will be started properly and, it inhibits all outputs from the microcontroller U1 until the inputs have had time to stabilize. After the "power on" reset is completed, the program stored in the PROM of microcomputer U1 is started.

The program first initializes output P20 (microcomputer U1 pin 21) which will be used to trigger the monostaple timer U3. This output is initialized to the high state because high to low transitions are required to trigger timer U3.

Next, the program scans each BCD digit of the operator controls 87, 88 and 89 to get the settings for the sequence parameters; DELAY TIME (two digits), REPEAT TIME (three digits), and NUMBER OF PULSES (two digits). Each of the seven BCD digit switches is read in turn by grounding its common line and then reading the four bit BCD buss. All seven digits are connected to the BCD bus through isolating diodes to allow multiplexing.

The microcontroller U1 selects a digit for reading by outputting the digit number (0-6) on pins 3538. These pins are connected to the four input lines of the 74LS154 decoder U2. This is a 4 line to 16 line decoder and, based upon the binary value at its four inputs, it grounds one and only one of its sixteen output lines. Decoder outputs 0 through 6 are connected to the common lines of the BCD digits. Using this decoder conserves microcontroller output lines by allowing up to eleven BCD digits to be scanned using only four of the microcomputer U1 outputs.

After the program has read all of the BCD digits and stored values for the sequence parameters, it examines the TO input (decoder U2 pin 1) to determine the state of the pan sensor 60. The pan sensor output is optically isolated by one section of the PS2501-4NEC quad opto-isolator U6.

When the pan sensor 60 has a target within its useful range, its output goes low (sinks current) and causes the LED in U6 to turn "on". This causes the photo-transistor output of U6 to turn "on" and pulls the TO input of the microcontroller to a low state. Thus, when the pan sensor acquires a target such as the leading edge of a pan or cavity, it causes a high to low transition at the TO input of microcomputer U1.

When the program detects such a transition, it begins a pulse sequence. When this input does not change state or when the input changes from low to high, the program loops back to read the BCD switches and the TO input again. This prevents the sequence controller 20 from producing a spray sequence on the trailing edges of cavities or pans.

After the program has detected the pan sensor signal, it begins a sequence by setting the microcontroller on-board timer for a 0.01 second delay. Then, the program executes this delay a number of times equal to the current "DELAY TIME" setting. This provides a total delay time of (0.01 × "DELAY TIME") seconds. When the total delay time has been executed, the program checks to see if the "NUMBER OF PULSES" read from the BCD switches is zero. If it is, then the sequence is terminated and the program returns to scanning the BCD switches 87, 88 and 89 and the pan sensor 60. If it is not zero, then the first spray is triggered.

The microcontroller U1 produces a spray trigger pulse by pulling output P20 (microcomputer U1 pin 21) low for a few microseconds. This forms a trigger pulse at pin 2 of the monostable circuit 95 illustrated in FIG. 13B which is composed of timer U3, resistor R2, and capacitors C6, and C7.

The monostable circuit 95 produces a single pulse which is a few milliseconds long for each trigger pulse it receives. This action stretches the trigger pulse out to give adequate spray applicator triggering while allowing the microcontroller U1 to quickly resume its timing cycle.

The output of the monostable 95 (timer U3 pin 3) is connected through a current limiting resistor R3 to the quad opto-isolator U5. This output is connected to the spray applicator through the "CONTROLLER OUTPUT" switch 80 when it is in the "PULSE SEQUENCE" position 83. After each spray trigger has been produced, the program determines if the correct "NUMBER OF SPRAYS" have been triggered. If so, the program loops back to its beginning and reads the BCD switches again. If more sprays are required, the program enters the repeat time loop. This loop is very similar to the delay time loop described earlier. However, the delay increments are 0.005 seconds instead of 0.01 seconds. Also, this delay loop is repeated the number of times indicated on the "REPEAT TIME" control 88. After the total "REPEAT TIME" has expired, another spray trigger is issued. Again the program checks the number of spray triggers issued during this sequence against the "NUMBER OF SPRAYS" read from the BCD switches 87, 88 and 89 at the start of the sequence. If more sprays are needed, then the repeat time loop is entered. If not, then the sequence is complete and the program loops to its beginning.

The following is an installation procedure which assumes that oiler 509 and pan sensor 60 have already been installed, and that the reader is familiar with oiler 509. The sequence controller 20 is fully contained in an enclosure 25 and receives all necessary power from oiler 509.

1. Mount the sequence controller 20 enclosure 25 as close to the pan sensor 60 and oiler 509 as possible. It should be mounted or graded to protect it from collision with mobile equipment. Permanent mounting on the conveyor is best, but the sequence controller 20 can be mounted to oiler 509 if the oiler is to be used in more than one location.

2. Connect one interface cable 20 between the sequence controller 20 connector marked SENSOR and the connector on the pan sensor assembly 60.

3. Connect the remaining interface cable 24 between the sequence controller 20 connector marked OUTPUT and the pan sensor connector 525 of oiler 509.

To verify normal operation of the sequence controller 20 perform the following tests:

1. Turn oiler 509 "on" and turn "off" all but one spray valve 42a. Something should be placed under the valve 42a to catch any spray.

2. Select a setting of 20 on the OIL QUANTITY thumbwheel switches 512, and allow oiler 509 to warm up for 15 minutes.

3. Press the "PROXIMITY SWITCH" pushbutton 516 on oiler 509 and insure that it gives one short spray.

4. Set the "CONTROLLER OUTPUT" selector switch 80 on the sequence controller 20 to the SENSOR SIGNAL position 81.

5. Insure that nothing is over the pan sensor 60. Push the JOG button 84 on the sequence controller 20 and verify that oiler 509 gives one short spray.

6. Slide a pan 12 or other metal object over the pan sensor 60 and verify that oiler 509 gives one short spray for each pan sensor activation.

7. Change the CONTROLLER OUTPUT switch 80 to the OFF position 82, repeat steps 5 and 6 above and verify that no sprays are triggered.

8. Change the CONTROLLER OUTPUT switch 80 to the PULSE SEQUENCE position 83. Set DELAY TIME 87 to 00. Set REPEAT TIME to 000. Set NUMBER OF PULSES to "00". Push the JOG button 84 and verify that oiler 509 does not spray.

9. Set NUMBER OF PULSES 89 to "01". Push the JOG button 84 and verify that oiler 509 does not spray.

10. Set REPEAT TIME 88 to "020". Push the JOG button 84 and verify that oiler 509 gives one short spray.

11. Increase the NUMBER OF PULSES 89 by one and push the JOG button 84. Verify that oiler 509 gives the number of sprays that are indicated on the NUMBER OF PULSES control 89.

12. Repeat step 11 above for all settings 1–9 of the right hand digit of the NUMBER OF PULSES control 89.

13. Set the NUMBER OF PULSES 89 control to "10".

14. Increase the NUMBER OF PULSES by ten and push the JOG button 84. Verify that oiler 509 gives the number of sprays indicated.

15. Repeat step 14 above for all settings of the left hand digit (10,20,30, . . . 90) of the NUMBER OF PULSES control 89.

16. Set the REPEAT TIME control 88 to "005". Set the NUMBER OF PULSES 89 control for "04". Push the JOG button 84 and listen to rate at which the four sprays occur.

17. Increase the right hand digit of the REPEAT TIME control 88 by one count and push the JOG button 84. Listen to the spray rate again, and verify that the rate seems slower.

18. Repeat step 17 above for the remaining positions of the right hand digit of the REPEAT TIME control 88 (006,007,008,009). At each position the spray rate should seem slower than the one before it.

19. Set the REPEAT TIME control 88 to "010". Push the JOG button 84 and listen to the spray rate.

20. Increase the middle digit of the REPEAT TIME control 88 by one count and push the JOG BUTTON 84. Listen to the spray rate again, and verify that the rate seems slower.

21. Repeat step 20 above for the remaining positions of the middle digit of the REPEAT TIME control 88 (020,030,040, . . . 090).

22. Set the REPEAT TIME control 88 to "100". Push the JOG button 84 and listen to the spray rate.

23. Increase the left hand digit of the REPEAT TIME control 88 by one count and push the JOG BUTTON 84. Listen to the spray rate again, and verify that the rate seems slower.

24. Repeat step 23 above for the remaining positions of the left hand digit of the REPEAT TIME control 88 (200,300,400, . . . 900). At each position the spray rate should seem slower than the one before it. It should be that the time between sprays will approach 4.5 minutes as this digit is increased to "9". Once a sequence of sprays has been started it can only be stopped by pushing the SEQUENCE RESET button or removing power from the oiler. To avoid unnecessary waiting, use the SEQUENCE RESET button after proper spray rate has been verified.

25. Set the DELAY TIME control 87 for "00". Set the REPEAT TIME control 88 for "000". Set the NUMBER OF PULSES control 89 for "01".

26. Push the JOG button 84 and verify that a single spray seems to occur immediately.

27. Increase the right hand digit of the DELAY TIME control 87 by one count, and push the JOG button 84. Verify that delay from the time the JOG button 84 is pushed to the time that the spray is seen or heard seems slightly longer than at the previous setting.

28. Repeat step 27 above for the remaining positions of the right hand digit of the DELAY TIME control 87 (02,03,04, . . . 09).

29. Set the DELAY TIME control 87 for "10".

30. Push the JOG button 84 and verify that a single spray seems to occur after a slight delay.

31. Increase the left hand digit of the DELAY TIME control 87 by one count, and push the JOG button 84. Verify that delay from the time the JOG button 84 is pushed to the time that the spray is seen or heard seems slightly longer than at the previous setting.

32. Repeat step 31 above for the remaining positions of the left hand digit of the DELAY TIME control 87 (20,30,40, . . . 90).

This completes the function check of the sequence controller 20.

Operation

The sequence controller 20 greatly expands the oiling capabilities of oiler 509. However, both the sequence controller 20 and oiler 509 must be set-up and adjusted properly to achieve the full benefits of the sequence controller 20. Due to the wide variety of pans and the number of different oiling patterns that can be used, it is impractical to give specific set-up instructions for every situation. Therefore, experimentation with different settings is encouraged. This will lead to the best settings and will give valuable experience with the sequence controller 20 and oiler 509 controls.

When the sequence controller 20 and oiler 509 are used together, the sprays are triggered by the sequence controller 20, put the duration of each individual spray is still determined by the setting of the OIL QUANTITY control on oiler 509. If the OIL QUANTITY control is set too high, excessive amounts of oil will be used and the duration of each spray may be longer than the selected time between sprays (REPEAT TIME), and this will result in uneven spray patterns.

1. Insure that the sequence controller 20, oiler 509, and the pan sensor are properly mounted and connected.

2. Turn "on" oiler 509 and allow it to warm up for at least 15 minutes. This lets the temperature of the oil and spray valves stabilize. It is not necessary to turn "on" the sequence controller 20 since it receives power automatically when oiler 509 is "on".

3. Determine the number of oiler 509 spray nozzles 42 to be used to cover the width of the pan 12. Position these nozzles 42 on oiler 509 spray arm, and turn all other nozzles off with oiler 509 nozzle switches.

4. Using the PUSH TO SPRAY button on oiler 509, adjust the nozzle spacing and spray arm height to get thorough coverage and minimum over-spray across the width of the pan.

5. Set the OIL QUANTITY control on oiler 509 to "01". While repeatedly pushing the PUSH TO SPRAY button, increase the OIL QUANTITY setting by one count at a time until all spray nozzles just begin to give a pull spray pattern. This will normally occur at an OIL QUANTITY setting of "5" to "15".

6. Add 2 counts to the minimum spray setting found in step 5. This will insure consistent operation of the valves while providing a minimum amount of oil per spray. It will also allow the highest spray sequence rate.

7. Insure that the pan sensor angle and height is properly set. Position oiler 509 spray arm so that it is centered cross the pan, and perpendicular to pan flow. Move oiler 509 so that the centerline of the spray nozzles is directly over the proximity switch in the pan sensor 60. When the sequence controller 20 is used in the PULSE SEQUENCE mode, the sprays can be shifted upstream or downstream electronically which allows the spray arm to remain in a fixed position over the pan sensor 60.

8. Turn the CONTROLLER OUTPUT selector switch 80 on the sequence controller 20 to the PULSE SEQUENCE position 83. Estimate the number of sprays that will be needed along the length of the pan 12, and enter this number on the NUMBER OF PULSES control 89 of the sequence controller 20.

9. Set the DELAY TIME control 87 of the sequence controller 20 to "00". Set the REPEAT TIME control 88 of the sequence controller 20 to "020". Push a pan over the pan sensor 60 and verify that oiler 509 sprays the correct number of times. Turn "on" the conveyor 15 and feed pans 12 singly by hand for the remainder of this procedure.

10. Feed one pan 12 from a point far enough upstream of the oiler 509 so that the pan 12 is fully stabilized when it goes over the pan sensor 60. Observe the position of the first spray in the pan.

11. If the position of the first spray is not correct, make a slight change to the DELAY TIME control 87 and repeat step 10 above. Increasing the DELAY TIME setting 87 will shift the first spray upstream on the pan. Decreasing the DELAY TIME setting 87 will shift the first spray downstream on the pan.

12. Repeat step 11 above until the position of the first spray is correct.

13. Feed another pan 12, and observe the position of the last spray on the pan.

14. If the position of the last spray is not correct, make a slight change to the REPEAT TIME control 88 and repeat step 13 above. Increasing the REPEAT TIME setting 88 will shift the last spray upstream on the pan. Decreasing the REPEAT TIME setting 88 will shift the last spray downstream on the pan.

15. Repeat step 14 above until the position of the last spray is correct.

16. At this point a complete pattern of sprays should be properly positioned on the pan. Evaluate this pattern for complete coverage, quantity of oil on the pan, and the amount of over-spray. If there are dry areas in corners and between sprays, they can be reduced by using more nozzles, placing them closer together, and reducing the height of the spray arm to get smaller individual spray diameters. The NUMBER OF PULSES 89 will need to be increased and steps 10 through 15 repeated.

Although these changes allow the pattern of sprays to more nearly conform to the shape of the pan and reduce the size of dry spots, they will also increase the amount of oil in each pan. A trial and error technique should be used to find the best combination of the number of nozzles, nozzle spacing, nozzle height, and NUMBER OF PULSES, and OIL QUANTITY. With multiple sprays, the minimum OIL QUANTITY setting determined in steps 5 and 6 above will generally be preferred because it allows the greatest number of sprays to be applied to a pan while using the last amount of oil. However, if a pattern of sprays is found which gives good coverage, but not enough oil, the OIL QUANTITY control 512 on oiler 509 can be increased. This will not effect the pattern of sprays generated by the sequence controller 20 unless the individual spray time, which is set by the OIL QUANTITY control 512 is longer than the time between individual sprays, which is set by the REPEAT TIME control 88. This will not normally be a problem unless the sequence controller 20 is set for very fast sprays (REPEAT TIME settings below "020"). If this problem is suspected a good rule of thumb is that the number shown on the OIL QUANTITY control of oiler 509 should never be more than four times the number shown on the REPEAT TIME control 88 of the sequence controller 20.

FIGS. 15–18 illustrate a rectangular sheet pan 12 and a sequence of spray patterns formed by three nozzles spraying simultaneously on partial areas in the pan. It will be noted that nozzle No. 1, nozzle No. 3 and nozzle No. 5 are actuated simultaneously, each spraying four pulses onto partial areas in the bottom of the pan.

FIGS. 19–22 illustrate a spraying sequence of seven nozzles for spraying partial areas in a circular sheet pan 13. It will be noted that nozzle No. 4 is actuated four times, nozzles 3 and 5 are actuated three times, nozzles 2 and 6 are actuated two times, and nozzles 1 and 7 are each actuated one time to form the pattern illustrated in FIG. 21.

While the circuit diagram in sequence controller 20 hereinbefore described has been limited to a system for simultaneously acutating one or more valves, for example, to form the pattern illustrated in FIG. 17, it should be readily apparent that the described circuit can be duplicated any number of times for controlling any number of valves, for example, to form the pattern illustrated in FIG. 21.

FIGS. 23–26 illustrate the use of four valves, each being actuated two times for spraying partial areas in a pan 14 having a plurality of cavities 14a, 14b and 14c.

From the foregoing it should be readily apparent that the sequence controller 20 hereinbefore described is particularly adapted for controlling one or more spray nozzles for providing precise control of the application of oil films to the surfaces of a pan or to the surface of products carried in the pans. The use of electrostatic sprayer assembly 10 in a pan oiler provides precision control of both the spraying and the distribution of droplets of liquid release agent or other coatings which is particularly adapted for use in commercial bakery and food service operations.

What is claimed is:

1. A method of applying liquid to a surface of a pan carried by a conveyor comprising the steps of: positioning a sensor to determine when a product is in a predetermined location; delivering a signal to a controller when a pan is in a predetermined location; causing the controller to initiate a first spray cycle at the expiration of a first delay time interval and to terminate the first spray cycle at the expiration of a second time interval; and causing the controller to initiate a second spray cycle at the expiration of a third repeat time interval and to terminate the second spray cycle at the expiration of a fourth time interval, said third time interval after termination of said first spray cycle and before initiation of said second spray cycle being selected to cause a film of liquid formed on the pan surface during the first spray cycle and a film of liquid formed on the pan surface during the second spray cycle to be substantially continuous and uniform over said pan surface.

2. The method of claim 1, the step of initiating at least one of said spray cycles comprising the steps of: atomizing a mass of liquid to form droplets; moving the droplets between electrically charged electrodes to electrically charge the droplets; and moving the charged droplets in the vicinity of an oppositely charged pan surface to form a film on the pan surface.

3. The method of claim 2, the step of moving charged droplets in the vicinity of an oppositely charged pan surface comprising the step of: propelling the droplets along a trajectory to impinge against the pan surface.

4. The method of claim 1, the step of initiating a spray cycle comprising the steps of: atomizing a mass of cooking oil to form droplets; moving the oil droplets between a pair of electrodes having curved surfaces charged to an electrical potential of greater than four kilovolts to electrically charge the droplets of oil; and moving the charged droplets of oil in the vicinity of an oppositely charged pan surface to form an oil film on the pan surface.

5. The method of claim 1, the step of initiating a spray cycle comprising the steps of: atomizing a mass of cooking oil to form droplets; electrically charging the oil droplets; projecting the charged droplets at a velocity in a range between 10 and 20 meters per second along a trajectory to impinge against an oppositely charged pan surface to cause the droplets to spread over the pan surface and to be retained in contact therewith as the charge on droplets is dissipated.

6. The method of claim 1, the steps of causing the controller to initiate first and second spray cycles comprising the step of spraying atomized liquid toward a partial area in a pan for predetermined time intervals, said repeat time interval after termination of said first spray cycle and before initiation of said second spray cycle being adjustable.

7. The method of claim 6, the step of causing the controller to initiate a first spray cycle comprising the step of actuating a first nozzle to spray atomized liquid on a first partial area of a surface in a pan; the step of causing the controller to initiate a second spray cycle comprising the step of actuating a second nozzle to spray liquid on a second partial area on the surface in the pan; and said first and second partial areas being controlled by adjusting the duration of the first spray cycle, the second spray cycle and the repeat time to form a substantially continuous film on the pan surface.

8. A method of forming a film of oil on surfaces in pans carried by a conveyor comprising the steps of: initiating a cycle for spraying atomized oil toward a first partial area on the surface in a pan for a predetermined time interval; initiating a second cycle for spraying atomized oil toward a second partial area on a surface in the pan; and controlling said first and second time intervals such that oil sprayed on the first and second partial areas forms a substantially continuous film of oil over surfaces in the pan.

* * * * *

UNITED STATES PATENT AND TRADEMARK OFFICE
CERTIFICATE OF CORRECTION

PATENT NO. : 5,110,616
DATED : May 5, 1992
INVENTOR(S) : James H. Lair; John E. Fagan It is certified that error appears in the above-identified patent and that said Letters Patent is hereby corrected as shown below:

Column 6, line 43, change "cooling" to read -- cooking --;
Column 10, line 66, change "monostaple" to read -- monostable --;
Column 14, line 29, change "put" to read -- but --; and
Column 15, line 58, change "last" to read -- least --.

Signed and Sealed this

Nineteenth Day of October, 1993

Attest:

BRUCE LEHMAN

*Attesting Officer*     *Commissioner of Patents and Trademarks*